United States Patent
Wakayama

(10) Patent No.: US 7,830,393 B2
(45) Date of Patent: Nov. 9, 2010

(54) DEVICE, METHOD, AND INTEGRATED CIRCUIT FOR RECTANGULAR IMAGE DRAWING

(75) Inventor: Yorihiko Wakayama, Osaka (JP)

(73) Assignee: Panasonic Corporation, Osaka (JP)

( * ) Notice: Subject to any disclaimer, the term of this patent is extended or adjusted under 35 U.S.C. 154(b) by 890 days.

(21) Appl. No.: 11/664,412

(22) PCT Filed: Oct. 12, 2005

(86) PCT No.: PCT/JP2005/018792

§ 371 (c)(1),
(2), (4) Date: Apr. 2, 2007

(87) PCT Pub. No.: WO2006/041094

PCT Pub. Date: Apr. 20, 2006

(65) Prior Publication Data

US 2008/0074434 A1    Mar. 27, 2008

(30) Foreign Application Priority Data

Oct. 13, 2004  (JP) .............................. 2004-298697

(51) Int. Cl.
*G09G 5/36* (2006.01)
*G09G 5/37* (2006.01)
*G06F 13/28* (2006.01)

(52) U.S. Cl. .................. 345/549; 345/562; 345/533

(58) Field of Classification Search .............. 345/530, 345/531, 533, 545, 549, 562, 672
See application file for complete search history.

(56) References Cited

U.S. PATENT DOCUMENTS

| 5,293,596 | A | | 3/1994 | Toyokura et al. | |
|---|---|---|---|---|---|
| 5,644,758 | A | * | 7/1997 | Patrick et al. | 345/562 |
| 5,717,848 | A | * | 2/1998 | Watanabe et al. | 345/474 |
| 6,992,648 | B2 | * | 1/2006 | Yamada | 345/88 |

FOREIGN PATENT DOCUMENTS

| JP | 4-218847 | 8/1992 |
|---|---|---|
| JP | 2001-209370 | 8/2001 |
| JP | 2002-140702 | 5/2002 |

* cited by examiner

*Primary Examiner*—Joni Hsu
(74) *Attorney, Agent, or Firm*—Wenderoth, Lind & Ponack, L.L.P.

(57) ABSTRACT

In the case where a previous character (P1) is cleared on a screen (20) and a new character (P2) is displayed on the right of the previous one, first, image data to be transferred (P2) is prepared in a source image memory. Next, a write start address (W) is set at the head of a bit sequence of a left clearance width (LC)×BPP, which precedes the destination address (T) of a frame buffer into which the head (S) of the image data (P2) is to be written. After that, a series of burst transfer repeatedly copies clearance data held in a register into a region of the left clearance width (LC), starting from the write start address (W), and subsequently writes one line (a transfer width (W1)×BPP) of the image data (P2). The write start address is incremented by a frame width (FW)×BPP.

5 Claims, 18 Drawing Sheets

DEVICE, METHOD, AND INTEGRATED CIRCUIT FOR RECTANGULAR IMAGE DRAWING

TECHNICAL FIELD

The present invention relates to a device, a method, and an integrated circuit that draws rectangular images with hardware.

BACKGROUND OF THE INVENTION

Recently, image drawing devices have been widely installed in appliances such as personal computers, recording/reproducing apparatuses, and broadcasting receiver units. The improvement in processing power of the image drawing device allows the appliance to handle images of higher definition, or display images with higher pixel density, in order to provide more beautiful images to users.

High-definition images require improvements in the performance of image memory (hereinafter, memory) for storage of pixel brightness data, as well as the image drawing device. In particular, an improvement in the speed of a bus that connects between the memory and the image drawing device (regardless of a multi- or single-chip configuration) is important for the improvement in the performance thereof. However, the driving clock of the bus, which is usually slower than the driving clock of the image drawing device, constitutes a restriction on finer drawing.

A burst transfer function is provided to a memory typified by SDRAM in order to release the restriction. More specifically, in the burst transfer mode, each time one address is identified, a predetermined number of data items are continuously accessed from the address in synchronization with the clock. Accordingly, a memory access in the burst transfer mode is much faster than the memory access in the single transfer mode. The advantage of the burst transfer mode is especially remarkable in the drawing process, since the brightness data of pixels aligned in the transverse direction on a screen is usually placed at contiguous address regions in the memory.

In the drawing process, the address of the top or end of the memory region into which image data to be transferred are continuously written (hereinafter, write start address or write end address, respectively) does not generally match with any boundary (hereinafter, a burst boundary) of the unit of the burst transfer (hereinafter, a burst unit). Accordingly, an address at which writing is to be disabled (hereinafter, a write disabled address) is generally included in the burst unit that includes the write start address or the write end address.

In the past, unnecessary writing at the write disabled addresses has been prevented by negating write enable signals for write disabled addresses. However, when a momentarily displayed image is to be slightly shifted, for example, negating the write enable signals for the write disabled addresses may conversely fail to clear a portion of the image and change it to a background. In such cases, there arises a need to newly write the brightness data of the background color at the write disabled addresses preceding the write start address or behind the write end address. This makes it difficult to further reduce the access time of the memory.

The prior art disclosed in Reference 1 is known as a technology to speed up memory access by surmounting this difficulty (cf. FIG. 18). More specifically, write enable signals are first maintained to be asserted throughout a burst unit that includes a write start address or a write end address. Next, background color (e.g., white) brightness data and image data to be placed at write disabled addresses and other addresses included in the burst unit, respectively, are integrated into the same burst unit, and the burst unit is written into the memory. This expedites memory access.

Reference 1: Japan Published Patent Application No. 2002-140702

SUMMARY OF THE INVENTION

In the case where a rectangular image is shifted little by little in a CG animation and the like, for example, successive memory accesses, or if possible, a single memory access, efficiently achieve both the clearance of the image displayed at the last position (i.e., filling the image with a background color) and the drawing of the image at a new position, in order to reduce the access time of the memory. However, the prior art disclosed in Reference 1 writes brightness data of the background color only at write disabled addresses included in the burst unit that includes a write start address or a write end address. Accordingly, the image displayed at the last position can be insufficiently cleared if the amount of the shift of the rectangular image exceeds the number of pixels equivalent to the size of one burst unit (i.e., a burst length). In this case, another memory accesses is required in order to fill the region in which the image has been previously displayed with the background color. This results in the difficulty of further reducing the access time of the memory.

Instead of the method disclosed in Reference 1, there is another possible method for efficiently achieving both the clearance of the previous image and the drawing of the new image by a single memory access or successive memory accesses. The method first constructs a single image from the totality of images filling a predetermined area including an image to be shifted and the vicinity thereof with a background color, and then shifts the single image little by little. However, this method generally requires a larger size of image data, and thus a reduction of the access time of a memory is difficult. In addition, other memory accesses are required in order to fill the region in which the image has been previously displayed with the background color if the amount of the shift of the image exceeds the range of the predetermined area. Accordingly, a reduction of the access time of the memory is more difficult.

An object of the present invention is to provide a device and a method for drawing a rectangular image which realizes a further increase in the speed of memory access by efficiently achieving both the clearance of a rectangular image to be shifted before a shift and a drawing of the rectangular image after the shift regardless of an amount of the shift.

MEANS TO ATTAIN THE OBJECT OF THE INVENTION

A rectangular image drawing device according to the present invention is configured to write brightness data of a background color into an address region in an image memory assigned to a first rectangular region on a screen other than an overlap between the first rectangular region and a second rectangular region, and write brightness data of a rectangular image into an address region of the image memory assigned to the second rectangular region. The rectangular image drawing device comprises a computing unit configured to calculate the number of background-color pixels to be added to the rectangular image in the transverse direction on the basis of the amount of a transverse shift from the first rectangular region to the second rectangular region; and a writing unit configured to write brightness data of both the background-color pixels and the rectangular image into each line of the image memory simultaneously or successively.

The rectangular image drawing device according to the present invention is preferably composed of a computing circuit and an integrated circuit. More specifically, the computing circuit calculates the number of background-color pixels to be added to the rectangular image in the transverse direction on the basis of the amount of a transverse shift from the first rectangular region to the second rectangular region. On the other hand, the integrated circuit according to the present invention comprises a circuit configured to write brightness data of a background color into an address region of an image memory assigned to a first rectangular region on a screen other than an overlap between the first rectangular region and a second rectangular region, and write brightness data of a rectangular image into an address region of the image memory assigned to the second rectangular region. The integrated circuit comprises a holding circuit configured to hold the number of pixels calculated by the computing circuit; and a writing circuit configured to write brightness data of both the number of background-color pixels and the rectangular image into each line of the image memory simultaneously or successively.

A method for drawing a rectangular image according to the present invention uses the above-described device. The method is characterized by calculating the number of background-color pixels to be added to the rectangular image in the transverse direction on the basis of the amount of a transverse shift from the first rectangular region to the second rectangular region; and writing brightness data of both the background-color pixels and the rectangular image into each line of the image memory simultaneously or successively.

The above device and method for drawing a rectangular image calculates the number of background-color pixels to be added to the rectangular image in the transverse direction on the basis of the amount of a transverse shift from the first rectangular region to the second rectangular region; and writes brightness data of the calculated number of background-color pixels into the image memory simultaneously with or successively following the writing of the rectangular image. In other words, not all the addresses at which the brightness data of both the background color and the rectangular image is allowed to be written simultaneously or successively are write disabled addresses in a burst unit. Furthermore, there is no need to previously construct a single image from the totality of images filling the rectangular image to be shifted and the vicinity thereof with the background color. Therefore, the size of image data read from and written into the image memory is minimized, and no memory access is required only for the clearance of the rectangular image regardless of the amount of a transverse shift of the rectangular image. This expedites the memory accesses required for the transverse shift of the rectangular image.

In the rectangular image drawing device according to the present invention, preferably, when the shift from the first rectangular region to the second rectangular region comprises a longitudinal shift, the computing unit is configured to calculate the number of background-color lines to be added to the rectangular image in the longitudinal direction on the basis of the amount of the longitudinal shift; and the writing unit is configured to write brightness data of the background-color lines simultaneously or successively into each line of the image memory, at least at the addresses in the image memory assigned across a third region, which is the total of the first rectangular region and the second rectangular region. Thus, there is no need to previously construct a single image from the totality of images filling the rectangular image to be shifted and the vicinity thereof with the background color. Therefore, the size of image data read from and written into the image memory is minimized, and no memory access is required only for the clearance of the rectangular image regardless of the amount of a longitudinal shift of the rectangular image. This further expedites the memory accesses required for the longitudinal shift of the rectangular image.

In the rectangular image drawing device according to the present invention, preferably, the writing unit is configured to use burst transfer in writing, and if the amount of data to be written falls within a single burst unit, the writing unit writes the data simultaneously, and if the amount of data to be written extends over more than one burst unit, the writing unit writes the data successively. More preferably, the writing unit is configured to negate a write enable signal for a write disabled address included in a burst unit that comprises a write start address or a write end address that does not match with any boundary of the burst unit. Thus, the brightness data of both the background color and the rectangular image is seamlessly written by a series of the burst transfers. This further expedites the memory accesses.

MERITS OF THE INVENTION

The rectangular image drawing device and method according to the present invention writes the brightness data of a background color, whose amount has been calculated on the basis of the amount of a shift of a rectangular image, into the image memory simultaneously with or successively following the writing of the brightness data of the rectangular image, as described above. This can improve the efficiency of memory accesses for the clearance of the rectangular image before the shift and the drawing of the rectangular image after the shift. In particular, not all the addresses at which the brightness data of both the background color and the rectangular image is allowed to be written simultaneously or successively are write disabled addresses in a burst unit, in contrast to conventional devices and methods. In addition, there is no need to previously construct an image filling the rectangular image to be shifted and the vicinity thereof with the background color. Therefore, the size of image data to be transferred is minimized, and no memory access is required only for the clearance of the rectangular image regardless of the amount of the shift of the rectangular image. Thus, the rectangular image drawing device and method according to the present invention have the advantage of increasing the speed of memory access over conventional devices and methods.

DETAILED DESCRIPTION OF THE INVENTION

The best mode of the present invention will be explained below with reference to the drawings.

Figure 1:
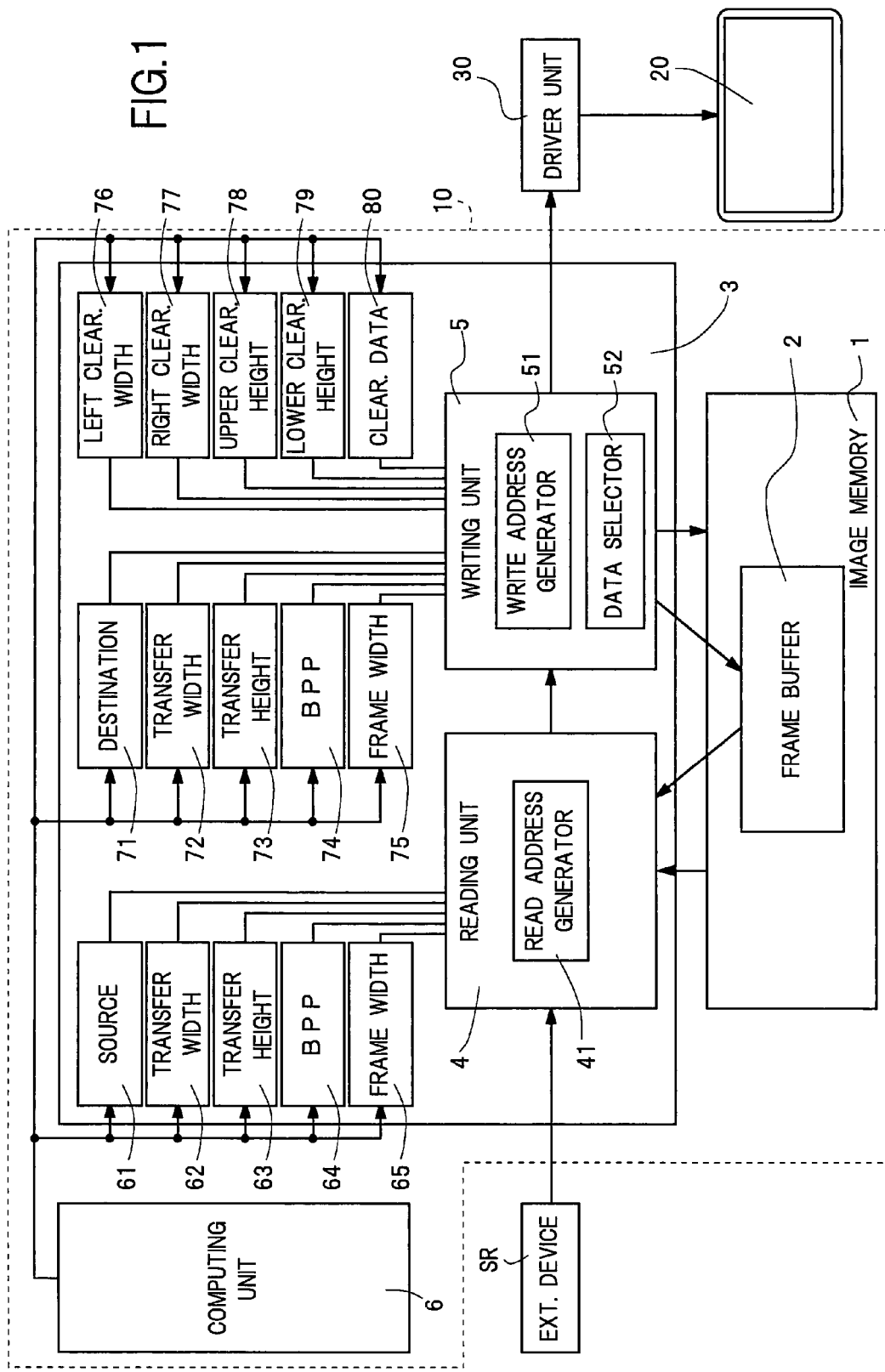
FIG. 1 is a block diagram that shows a rectangular image drawing device according to an embodiment of the present invention.

A rectangular image drawing device 10 according to an embodiment of the present invention is preferably installed in a display device together with a screen 20 and its driver unit 30 (cf. FIG. 1).

A plurality of pixels are arranged in a two-dimensional matrix on the screen 20. The rectangular image drawing device 10 reads and processes image data from an external device SR (e.g., a main memory, a HDD, a DVD drive, and a set-top box). The rectangular image drawing device 10, in particular, decodes and holds brightness data (or color data) of each pixel on the screen 20 from the image data. The driver unit 30 adjusts the brightness of each pixel on the screen 20 based on the brightness data of the pixel held by the rectangular image drawing device 10. Thus, an image represented by the image data is reproduced on the screen 20.

The rectangular image drawing device 10 preferably processes a sprite (i.e., a CG animation technique used to shift a specific image called a character, in general a rectangular image, within a screen). For example, when shifting a character displayed in a first rectangular region on the screen to a second rectangular region, the rectangular image drawing device 10 first determines the position of the second rectangular region with respect to the first rectangular region on the basis of the amount of the shift (a movement vector) of the character. The rectangular image drawing device 10 next fills the first rectangular region except for the overlap between the first rectangular region and the second rectangular region (hereinafter, a clearance region) with a background color, and thereby clears the portion of the character before the shift, which does not overlap the character after the shift. At the same time, the rectangular image drawing device 10 displays the character after the shift in the second rectangular region.

The rectangular image drawing device 10 preferably comprises an image memory 1, a frame buffer 2, a computing unit 6, and an integrated circuit 3. The image memory 1 and the frame buffer 2 are preferably a high-speed memory supporting burst transfer, more preferably an SDRAM. Alternatively, they may be an SRAM. The frame buffer 2 is more preferably included in the image memory 1.

The image memory 1 is used as a working memory in the rectangular image drawing device 10. Image data read from an external device SR are temporally stored in the image memory 1, and then read and processed as appropriate. The frame buffer 2 holds image data of each pixel on the screen 20 (in particular, brightness data of the pixel). The address space in the frame buffer 2 is expressed by a two-dimensional arrangement, and each address is linked to the coordinate of each pixel on the screen 20. Image data of each pixel (i.e., brightness data of each pixel) is stored at the address linked to the coordinate of the pixel.

The computing unit 6 is preferably a CPU. In the above-mentioned sprite, the computing unit 6 determines the position of the second rectangular region and the size of the clearance region from the amount of the shift (the movement vector) of the character. For example, the computing unit 6 determines the head address of an address region of the frame buffer 2, which are assigned to the second rectangular region.

Furthermore, the computing unit 6 calculates the number of background-color pixels to be added to the character after the shift in the transverse direction, i.e., the width of a clearance region adjacent to the left or right of the character after the shift (hereinafter, a left/right clearance width, and a left/right clearance region, respectively), on the basis of the amount of the transverse shift from the first rectangular region to the second rectangular region. Similarly, the computing unit 6 calculates the number of background-color lines to be added to the character after the shift in the longitudinal direction, i.e., the height of a clearance region adjacent to the top or bottom of the character after the shift (hereinafter, an upper/lower clearance height and an upper/lower clearance region, respectively), on the basis of the amount of the longitudinal shift from the first rectangular region to the second rectangular region.

The integrated circuit 3 controls data transfer of image data from the external device SR to the driver unit 30. The integrated circuit 3 in particular uses burst transfer mode in fast reading and writing of image data for the image memory 1 or the frame buffer 2. Here, the image data to be read and written represents an image displayed on a portion or the entirety of the screen 20. The display region of the image is rectangular in general, and the transverse/longitudinal direction of each rectangle matches with the transverse/longitudinal direction of the screen 20. The integrated circuit 3 in particular transfers a series of image data for each line (a series of pixels contiguously placed in the transverse direction on the screen 20) included in each rectangular region, i.e., each line of the image data.

The integrated circuit 3 comprises a reading unit 4 and its register group 61-65, and a writing unit 5 and its register group 71-80. The reading unit 4 reads image data from the external device SR, the image memory 1, or the frame buffer 2. When a source memory is in particular a high-speed memory, the reading unit 4 uses a read address generator unit 41 to successively read image data to be transferred by burst transfer. The read address generator unit 41 updates a destination address, i.e., a burst start address to be incremented by a predetermined burst length each on the basis of the data held by the register group 61-65 described below.

The register group 61-65 is a group of holding circuits that receive and hold data from the computing unit 6. The register group preferably comprises a source register 61, a first transfer width register 62, a first transfer height register 63, a first BPP register 64, and a frame width register 65. The source register 61 holds the head address of image data to be transferred.

The first transfer width register 62 holds the transfer width of the image data to be transferred (i.e., the number of pixels per line of the image data, or the number of pixels equivalent to the width of the image represented by the image data). The first transfer height register 63 holds the transfer height of the image data to be transferred (i.e., the number of pixels indicating the height of the image represented by the image data, which is equal to the number of lines included in the image data). The first BPP register 64 holds the number of bits per pixel (hereinafter, a BPP) of the image data stored in the source memory. Here, the BPP shows the color depth of the image represented by the image data.

The first frame width register 65 holds the above-mentioned transfer width when the entirety of the image data to be transferred is contiguously stored in the source memory. On the other hand, the first frame width register 65 holds the frame width of the frame buffer 2 (i.e., the total number of pixels placed in a transverse line on the screen 20) when the image data to be transferred are stored in the frame buffer 2. The same is true when the source memory comprises an address space similar to that of the frame buffer 2.

Figure 2:
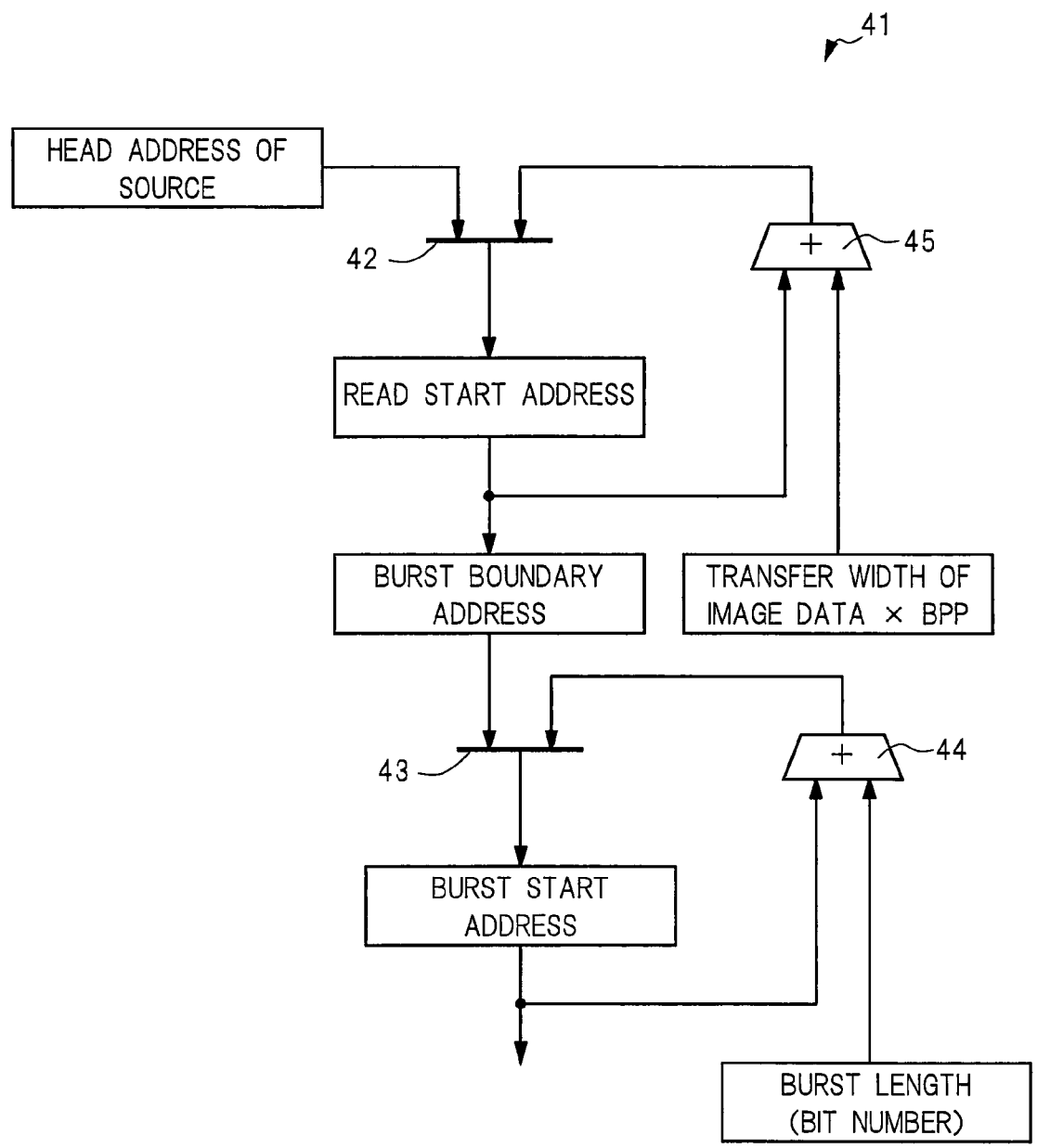
FIG. 2 is a block diagram that shows the configuration of a read address generator unit included in the rectangular image drawing device according to the embodiment of the present invention.

FIG. 2 is the block diagram which shows the configuration of the read address generator unit 41. When the reading unit 4 reads image data from the source memory, the read address generator unit 41 updates a read start address and a burst start address as follows. First, the head address of the image data to be transferred is read from the source register 61, and selected by a first selector 42 as a read start address. The selected read start address is rounded to the address of the next previous burst boundary. Here, a burst boundary means the head of a burst unit (or a block), and its address is predetermined at a fixed value in general. The address of the burst boundary is selected by a second selector 43 as an initial burst start address.

The reading unit 4 reads one burst unit each of data, i.e., a predetermined burst length (e.g., 4×4 bytes) each of data from the initial burst start address. Note that, in the burst unit read initially, bits from the initial burst start address to the address immediately preceding the read start address are actually ignored. (For example, the bits are not stored in a buffer memory inside the reading unit 4.) Each time one burst unit is completely read, a first adder 44 adds the number of bits equal to the burst length to the burst start address, and the second selector 43 selects the result of the addition as a new burst start address. Thus, the image data to be transferred is successively read from the read start address. Here, the total amount of the image data read successively is equal to the product of the transfer width and the BPP read from the first transfer width register 62 and the first BPP register 64, respectively (=transfer width×BPP). In other words, one line of the image data to be transferred is continuously read.

Next, a second adder 45 adds the transfer width×the BPP to the read start address, and the first selector 42 selects the result of the addition as a new read start address. Thus, the next line of the image data to be transferred is continuously read from the new read start address by the similar burst transfer. The above-described reading process is repeated the number of times equal to the transfer height read from the first transfer height register 63. As a result, the entirety of the image data to be transferred is read from the source memory.

The writing unit 5 writes the image data to be transferred read by the reading unit 4 into the driver unit 30, the image memory 1, or the frame buffer 2 (cf. FIG. 1). When the destination is in particular the frame buffer 2, the writing unit 5 uses a write address generator unit 51 and a data selector unit 52 to write the image data to be transferred by burst transfer, and simultaneously clearance the original image. The write address generator unit 51 updates a burst start address to be incremented by a predetermined burst length (e.g., 4×4 bytes) each on the basis of the data held by the register group 71-80 described below.

The register group 71-80 is a group of holding circuits that receive and hold data from the computing unit 6. The register group preferably comprises a destination register 71, a second transfer width register 72, a second transfer height register 73, a second BPP register 74, a second frame width register 75, a left clearance register 76, a right clearance register 77, an upper clearance register 78, a lower clearance register 79, and a clearance data register 80.

The destination register 71 holds the top address of a destination memory (i.e., a destination address) into which the head address of image data to be transferred is to be written. In the above-described sprite, in particular, the address of the frame buffer 2 assigned to the upper left corner of the second rectangular region is set to be the destination address. The second transfer width register 72 holds the transfer width of the image data to be transferred. The second transfer height register 73 holds the transfer height of the image data to be transferred. The second BPP register 74 holds the BPP of the image data to be written in the destination memory (which is equivalent to the color depth of the image represented by the image data).

The second frame width register 75 holds the above-mentioned transfer width when the entirety of the image data to be transferred is successively written into the destination memory. On the other hand, the second frame width register 75 holds the frame width of the frame buffer 2 when the image data to be transferred is written into the frame buffer 2. The same is true when the destination memory comprises an address space similar to that of the frame buffer 2.

The left clearance register 76 holds a left clearance width. The right clearance register 77 holds a right clearance width. The upper clearance register 78 holds an upper clearance height. The lower clearance register 79 holds a lower clearance height. The clearance data register 80 holds clearance data per pixel (preferably, brightness data which shows a fixed background color).

Preferably, the transfer width, the transfer height, and the BPP of the image data to be transferred that have been prepared in the source memory in advance match with the transfer width, the transfer height, and the BPP of the image data to be written into the destination memory, respectively. In that case, the second transfer width register 72, the second transfer height register 73, and the second BPP register 74 may double as the first transfer width register 62, the first transfer height register 63, and the first BPP register 64, respectively.

The data selector unit 52 counts data that the writing unit 5 writes into the destination memory. Furthermore, the data selector unit 52 selects either the image data to be transferred or the clearance data held by the clearance data register 80 as the data to be next written into the destination memory, on the basis of the count and the data held by the register group 71-80.

Figure 3:
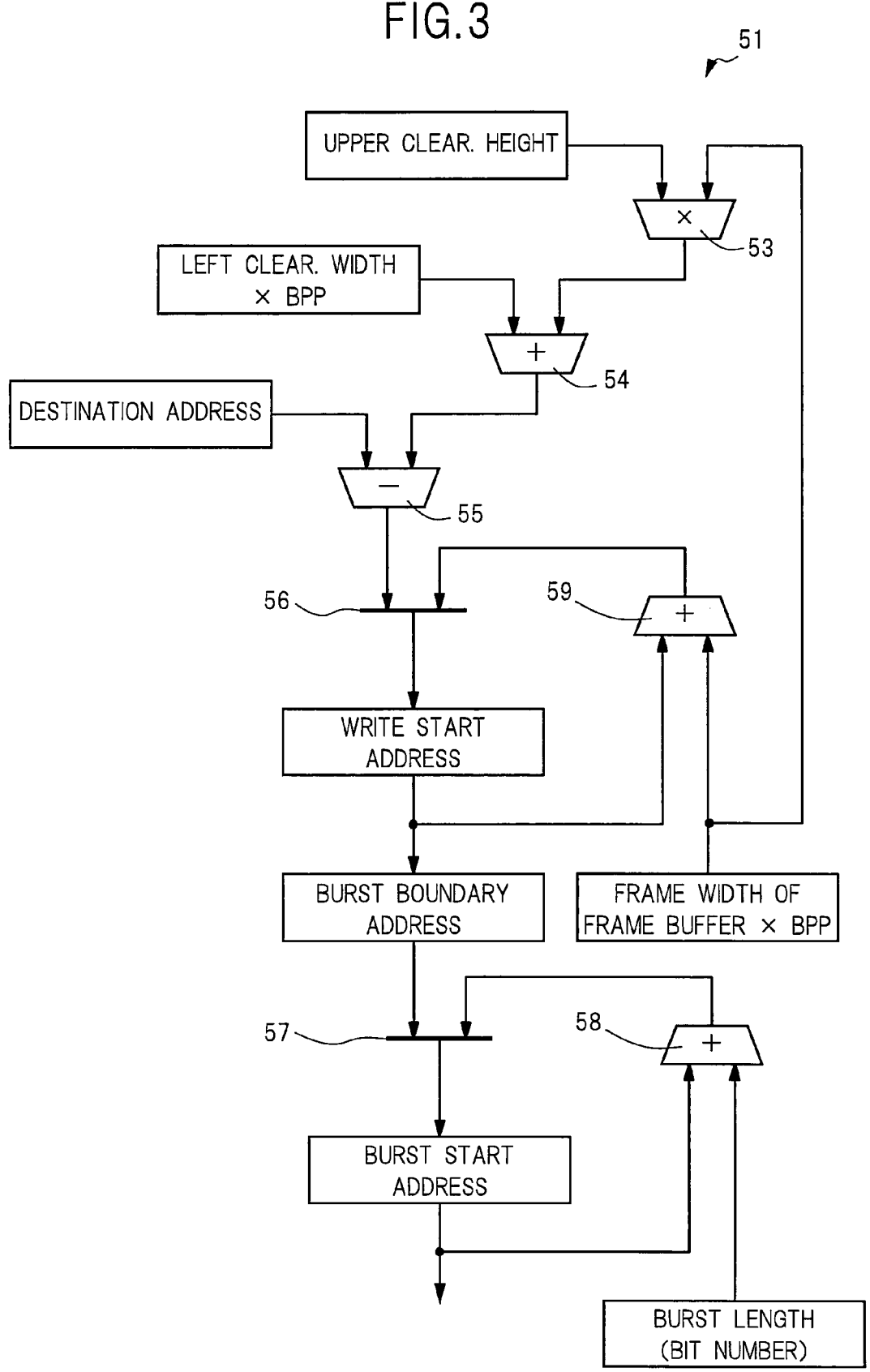
FIG. 3 is a block diagram that shows the configuration of a write address generator unit included in the rectangular image drawing device according to the embodiment of the present invention.

FIG. 3 is the block diagram which shows the configuration of the write address generator unit 51. When the writing unit 5 writes image data into the destination memory, the write address generator unit 51 updates a write start address and a burst start address as follows. First, the product of the frame width read from the second frame width register 75 and the BPP read from the second BPP register 74 (=the frame width× the BPP) is calculated. A multiplier 53 multiplies the product by the clearance height read from the upper clearance register 78. A third adder 54 adds the product of the left clearance width read from the left clearance register 76 and the BPP to the result of the multiplication. A subtracter 55 subtracts the result of the addition from the destination address. A third selector 56 selects the result of the subtraction as an initial value of the write start address.

The write start address selected by the third selector 56 is rounded to the address of the next previous burst boundary. Here, the address of each burst boundary is predetermined at a fixed value in general. Then, a fourth selector 57 selects the address of the burst boundary as an initial value of the burst start address.

The writing unit 5 successively writes data of a predetermined burst length (e.g., 4×4 bytes) each from the burst starting address. Note that write disabled addresses are assigned to the initial burst starting address through the address immediately preceding the write start address in the burst unit first sent from the writing unit 5 to the frame buffer 2, and thereby actual writing into the destination memory is prohibited (i.e., the write enable signal for the destination memory is negated). Thus, a write start address can be freely assigned to any position, regardless of the actual positions of the burst boundaries. In other words, the left clearance width can be adjusted to any value.

Each time one burst unit is completely written, a fourth adder 58 adds the number of bits equal to the burst length to the burst start address, and the fourth selector 57 selects the result of the addition as a new burst start address. Thus, a series of data is simultaneously or successively written from the write start address by burst transfer. More specifically, if the series of data falls within a single burst unit, the data is simultaneously written, and if the series of data extends over more than one burst unit, the data is successively written.

The writing unit 5 successively writes data of one line each. When the last address of the data of each line (hereinafter, a write end address) does not match with a burst boundary, write disabled addresses are assigned to the write end address through the address immediately preceding the next burst boundary, and thereby actual writing into the destination memory is prohibited (i.e., the write enable signal for the destination memory is negated). Thus, a write end address can be freely assigned to any position, regardless of the actual positions of the burst boundaries. In other words, the right clearance width can be adjusted to any value.

Each time data is written into the write end address, a fifth adder 59 adds the frame width×the BPP to the write start address, and the third selector 56 selects the result of the addition as a new write start address. Thus, a series of data is written from the write start address by burst transfer in a manner similar to the above manner.

Figure 4:
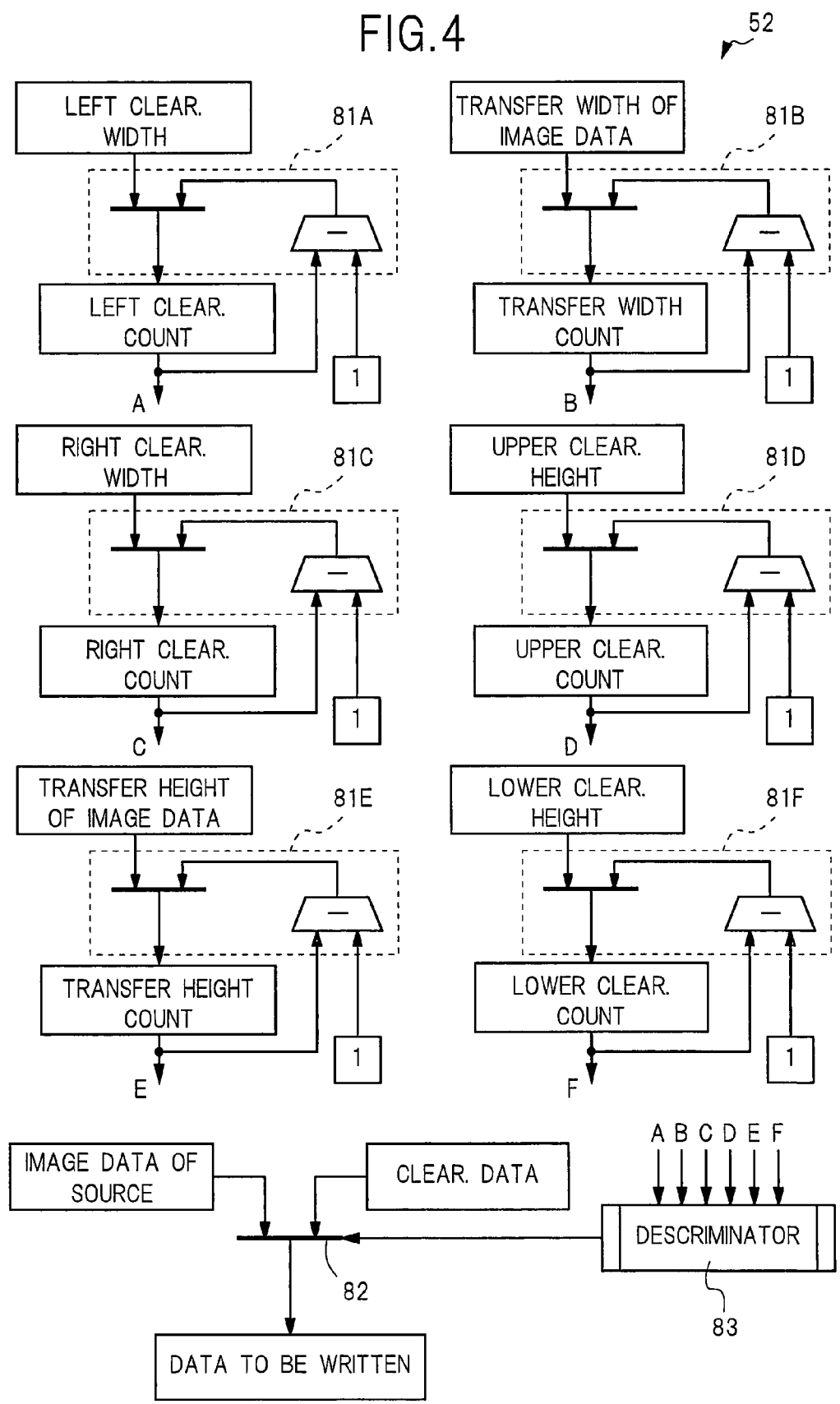
FIG. 4 is a block diagram that shows the configuration of a data selector unit included in the rectangular image drawing device according to the embodiment of the present invention.

FIG. 4 is the block diagram which shows the configuration of the data selector unit 52. The data selector unit 52 includes six down counters 81A-81F, a data selector 82, and a discriminator unit 83. Each of the six down counter 81A-81F preferably decrements the count by one, and stops counting when the count reaches 0.

Each time the write address generator unit 51 updates a write start address, the first down counter 81A resets its count (hereinafter, a left clearance count A) to a left clearance width read from the left clearance register 76. After that, the left clearance count A is decremented by one each time clearance data is read from the clearance data register 80.

Each time the left clearance count A reaches 0, the second down counter 81B resets its count (hereinafter, a transfer width count B) to a transfer width of the image data read from the transfer width register 72. After that, the transfer width count B is decremented by one each time one pixel of the image data to be transferred is sent from the writing unit 5.

Each time the transfer width count B reaches 0, the third down counter 81C resets its count (hereinafter, a right clearance count C) to a right clearance width read from the right clearance width register 77. After that, the right clearance count C is decremented by one each time the clearance data is read from the clearance data register 80.

Each time a new destination address is written into the destination register 71, the fourth down counter 81D resets its count (hereinafter, an upper clearance count D) to an upper clearance height read from the upper clearance register 78. After that, the upper clearance count D is decremented by one each time the write address generator unit 51 updates the write start address.

Each time the upper clearance count D reaches 0, the fifth down counter 81E resets its count (hereinafter, a transfer height count E) to a transfer height of the image data read from the transfer height register 73. After that, the transfer height count E is decremented by one each time the write address generator unit 51 updates the write start address.

Each time the transfer height count E reaches 0, the sixth down counter 81F resets its count (hereinafter, a lower clearance count F) to a lower clearance height read from the lower clearance register 79. After that, the lower clearance count F is decremented by one each time the write address generator unit 51 updates the write start address.

The data selector 82 selects either the image data to be transferred or the clearance data held by the clear data register 80 as the data to be actually written, in accordance with the instruction by the discriminator unit 83. The discriminator unit 83 provides the data selector 82 with the following instruction, based on the counts A-F of the six down counters 81A-81F. The instruction indicates: the selection of the clearance data if the upper clearance count D is larger than 0; if the upper clearance count D is 0 and the transfer height count E is larger than 0, the selection of the clearance data while the left clearance count A is larger than 0, and the selection of the image data while the left clearance count A is 0 and the transfer width count B is larger than 0; otherwise, the selection of the clearance data. If both the upper clear count D and the transfer height count E are 0, the instruction indicates the selection of the clearance data.

When a CG animation is displayed on the screen 20, the rectangular image drawing device 10 uses the above components to perform a sprite as follows. For example, a case shown in FIGS. 10-13 is assumed, where the rectangular image drawing device 10 clears an original character P1 displayed in a region (the first rectangular region), and then displays a new character P2 in a second rectangular region Q located in the lower right of the first rectangular region. Here, the image data (brightness data) which represents the new character P2 has been contiguously stored in specific regions of the image memory 1 in advance, and prepared for the image data to be transferred. A method for drawing a rectangular image according to an embodiment of the present invention prepares only the image data to be transferred P2 in the image memory 1 in advance, and eliminates the need to prepare the clearance data to be written in clearance regions, in especially contrast to the prior art method.

First, the computing unit 6 executes a program for the sprite process, and in particular, calculates the position of the second rectangular region Q and the sizes of the clearance regions based on the changes in movement vectors and sizes of the characters. The computing unit 6 then sets data in the register groups 61-65 and 71-80 based on the calculated position of the second rectangular region Q as follows (cf. FIG. 1.)

The source register 61 holds the head address S of the image data to be transferred P2. The first transfer width register 62 holds the number of pixels that indicates the width W2 of the new character P2 and is used as a transfer width of the image data to be transferred. The first transfer height register 63 holds the number of pixels that indicates the height H2 of the new character P2 and is used as a transfer height of the image data to be transferred. The first BPP register 64 holds a BPP of the image data stored in the image memory 1. The first frame width register 65 holds the above-described transfer width W2.

The destination register 71 holds the address in the frame buffer 2 assigned to the pixel T at the upper left corner of the second rectangular region Q in which the new character P2 is to be displayed, and the address is used as a destination address. The second transfer width register 72 holds the width W1 of the second rectangular region Q used as a transfer width of the image data. The second transfer height register 73 holds the height H1 of the second rectangular region Q used as a transfer height of the image data. The second BPP register 74 holds a BPP of the frame buffer 2. The second frame width register 75 holds the frame width FW of the frame buffer 2.

Figure 10:
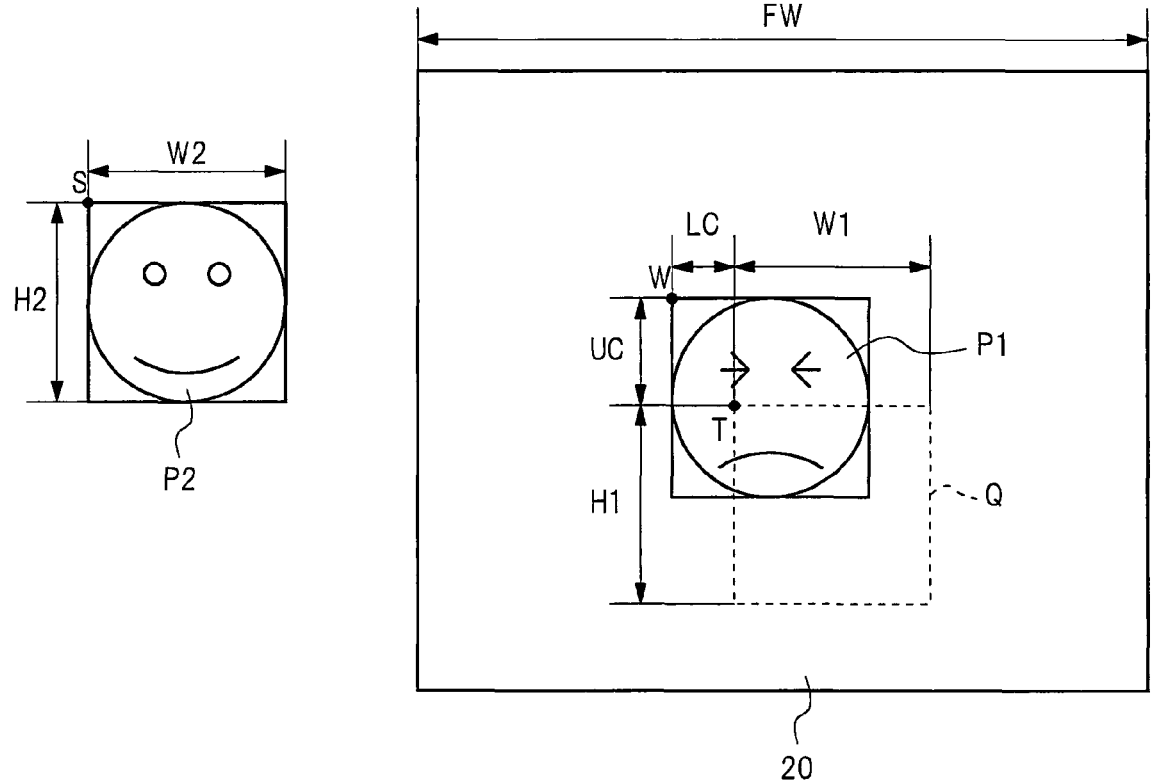
FIG. 10 is a schematic diagram that illustrates a process for clearing an original character displayed on a screen and drawing a new character stored in an image memory into the lower right region of the original character. First, the initial value of a write start address in the frame buffer is calculated on the basis of a first rectangular region in which the original character has been displayed and a second rectangular region in which the new character will be displayed.
Figure 11:
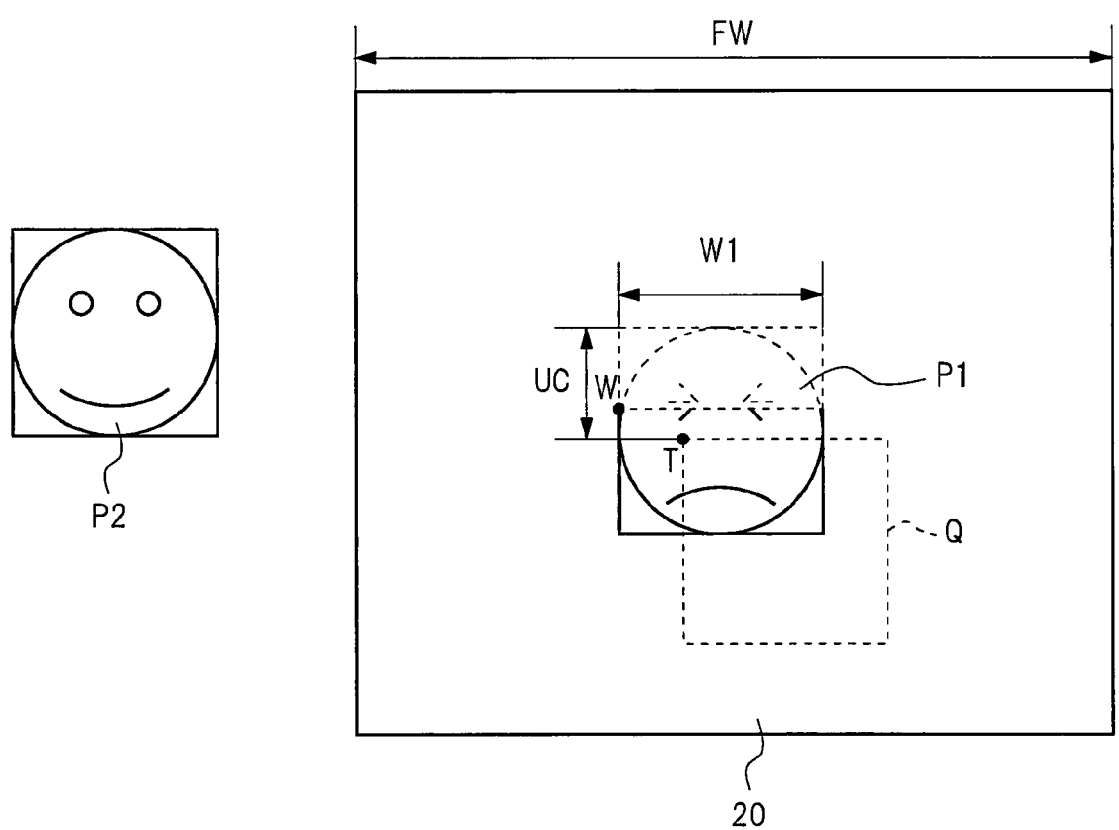
FIG. 11 is a schematic diagram that illustrates a process for clearing the original character displayed on the screen and drawing the new character stored in the image memory into the second rectangular region that is located at the lower right of the first rectangular region. Following the process shown in FIG. 10, clearance data is written into an area in the frame buffer assigned to an upper clearance region.

The left clearance register 76 holds an amount LC of the rightward shift of the character (in particular, the number of pixels arranged in the transverse direction between the left ends of the first rectangular region P1 in which the original character is displayed and the second rectangular region Q) that is used as the left clearance width (cf. FIG. 10). The right clearance register 77 holds 0 used as the right clearance width. The upper clearance register 78 holds an amount UC of the downward shift of the character (in particular, the number of lines located between the upper ends of the first rectangular region P1 and the second rectangular region Q) that is used as an upper clearance height. (cf. FIG. 10). The lower clearance register 79 holds 0 used as the lower clearance height. The clearance data register 80 holds clearance data of one pixel.

Figure 5:
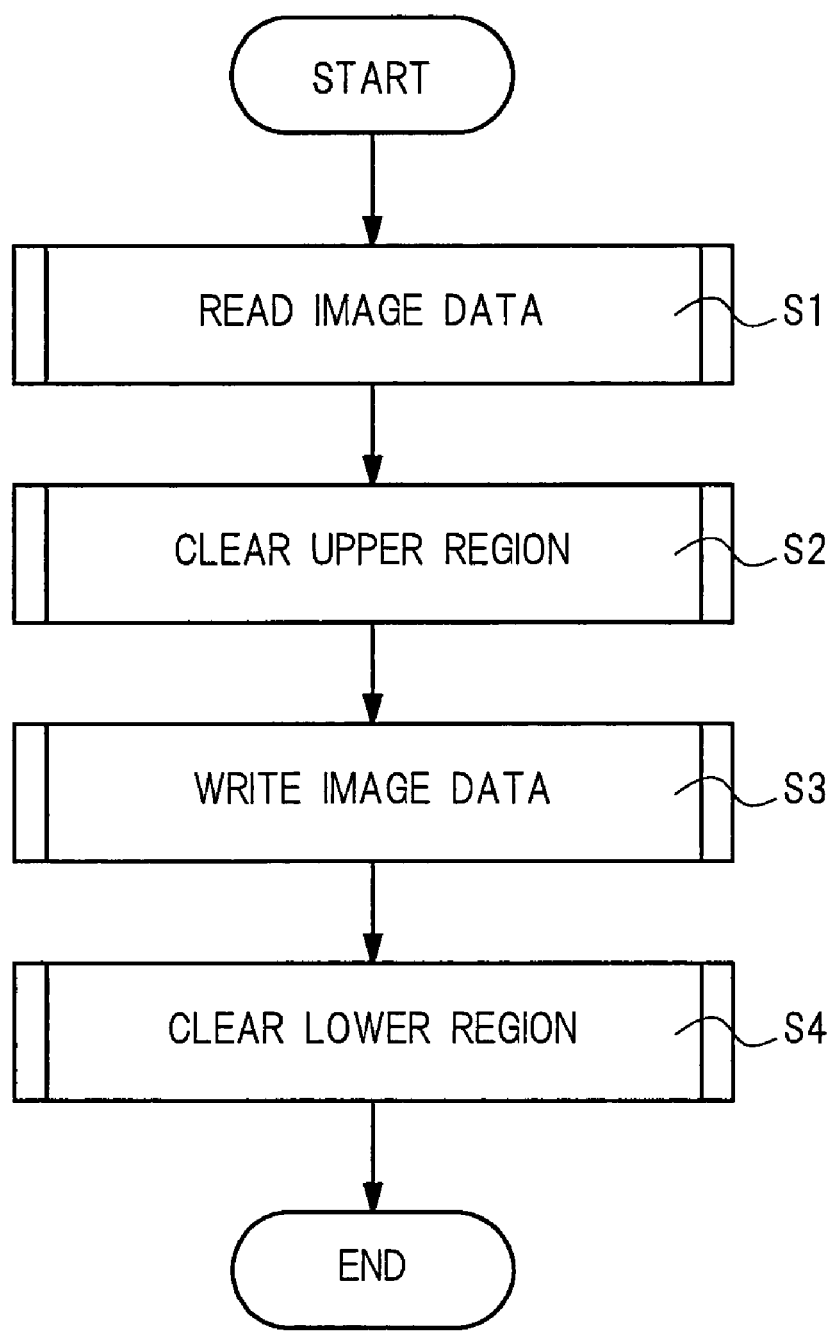
FIG. 5 is a flow chart that shows a transfer of image data from an image memory to a frame buffer (a bitblt) according to an embodiment of the present invention.

Next, the integrated circuit 3 transfers the image data from the image memory 1 to the frame buffer 2 in the order of the steps S1, S2, and S3 (cf. FIG. 5). Note that the clearance process (step S4) is skipped for the lower clearance region since the lower clearance height is 0 (details will be described below).

Step S1: The reading unit 4 reads the image data to be transferred P2 from the image memory 1 (cf. FIG. 1). Here, the transfer width, the transfer height, and the BPP of the image data to be transferred that has been prepared in the image memory 1 in advance are preferably matched with the transfer width W1, the transfer height H1, and the BPP of the image data to be written into the regions in the frame buffer 2 assigned to the region Q on the screen 20, respectively. Alternatively, the image data read from the image memory 1 may be processed before writing into the frame buffer 2, and thereby adjusted so that its transfer width, transfer height, and BPP are respectively matched with the transfer width W1, the transfer height H1, and the BPP of the image data to be written into the above-described regions in the frame buffer 2.

Step S2: The writing unit 5 clears the region in the frame buffer 2 assigned to the upper clearance region W1×UC (cf. FIGS. 1 and 11). Here, the upper clearance region W1×UC is a rectangular region that adjoins to the top of the second rectangular region Q on the screen 20 and includes the original character P1, and its width and height are equal to the transfer width W1 and the upper clearance height UC, respectively. The right and left ends of the upper clearance region W1×UC are respectively matched with the right and left ends of a third region that is the total of the first rectangular region P1 and the second rectangular region Q. In the case shown in FIG. 11, the right and left ends of the upper clearance region W1×UC are matched with the right and left ends of the first rectangular region P1, respectively.

Step S3: The writing unit 5 clears the region in the frame buffer 2 assigned to the left clearance region LC×H1, and at the same time, writes the image data to be transferred P2 into the region in the frame buffer 2 assigned to the second rectangular region Q (cf. FIGS. 12 and 13). Here, the left clearance region LC×H1 is a rectangular region that adjoins to the left side of the region Q on the screen 20 and includes the original character P1, and its width and height are equal to the left clearance width LC and the transfer height H1, respectively.

Figure 6:
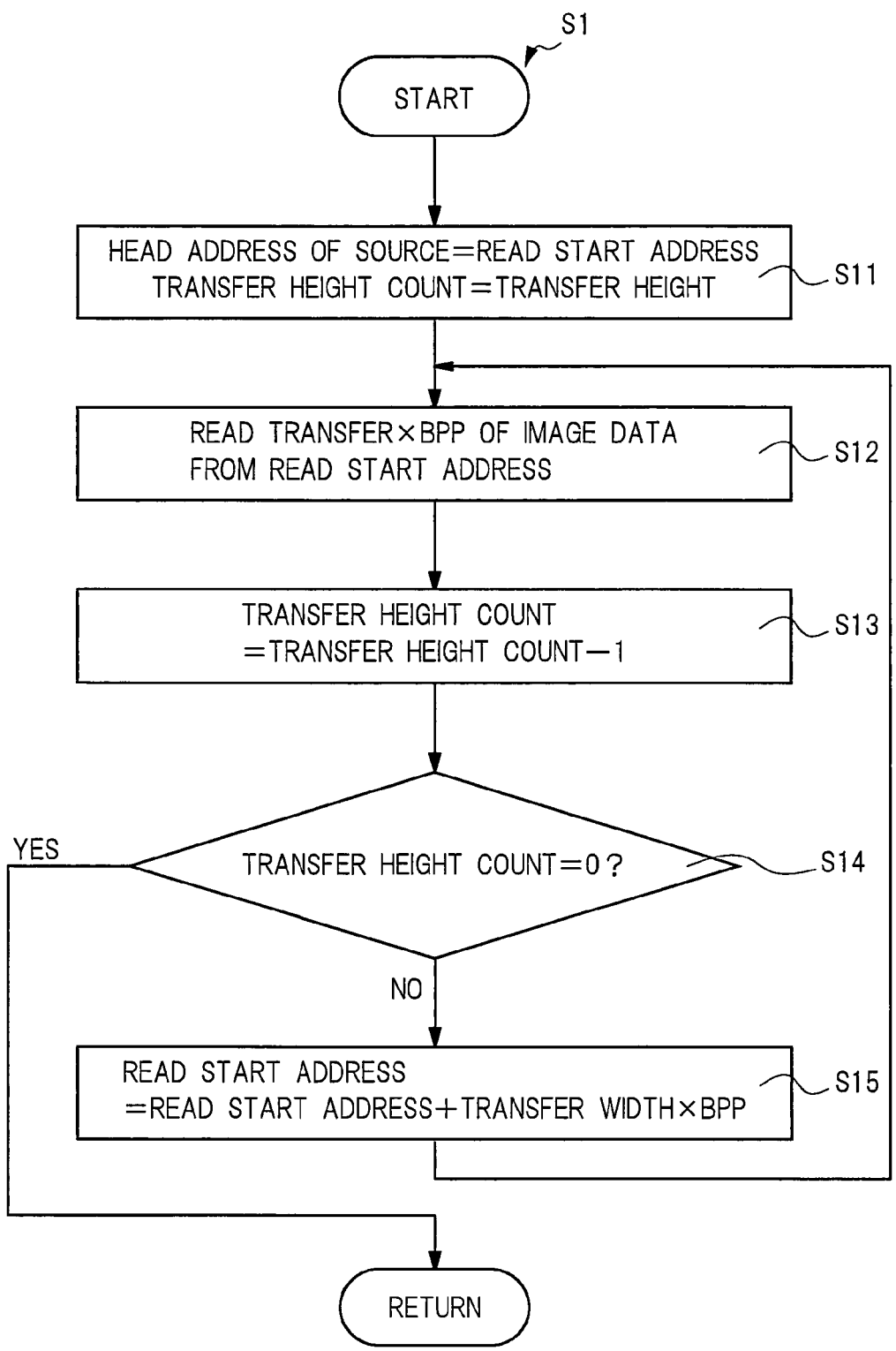
FIG. 6 is a flow chart that shows the details of the reading process for the image data (step S1) shown in FIG. 5.

FIG. 6 is the flow chart which shows the details (steps S11-S15) of the reading process (step 51) of the image data.

Step S11: The head address S of the image data to be transferred is read from the source register 61, and set to be a read start address (cf. FIGS. 2 and 10). On the other hand, the transfer height H2 is read from the first transfer height register 63, and set to be an initial value of the transfer height count.

Step S12: The head line of the image data to be transferred P2 (its data amount=the transfer width W2×the BPP) is successively read from the read start address S. The reading is in particular performed at high speed by the burst transfer mode (cf. FIG. 2).

Step S13: The transfer height count is decremented by one.

Step S14: It is determined whether or not the transfer height count reaches 0. The process proceeds to the step S15 if the transfer height count does not yet reach 0. The step S1 is finished if the transfer height count reaches 0.

Step S15: The read start address is incremented by the transfer width×the BPP (cf. FIG. 2), and thereby, the head address of the next line of the image data to be transferred P2 is set to be a new read start address. Through the repetition of steps S12-S15, each line of the image data to be transferred P2 is read by a burst transfer from the image memory 1.

Figure 7:
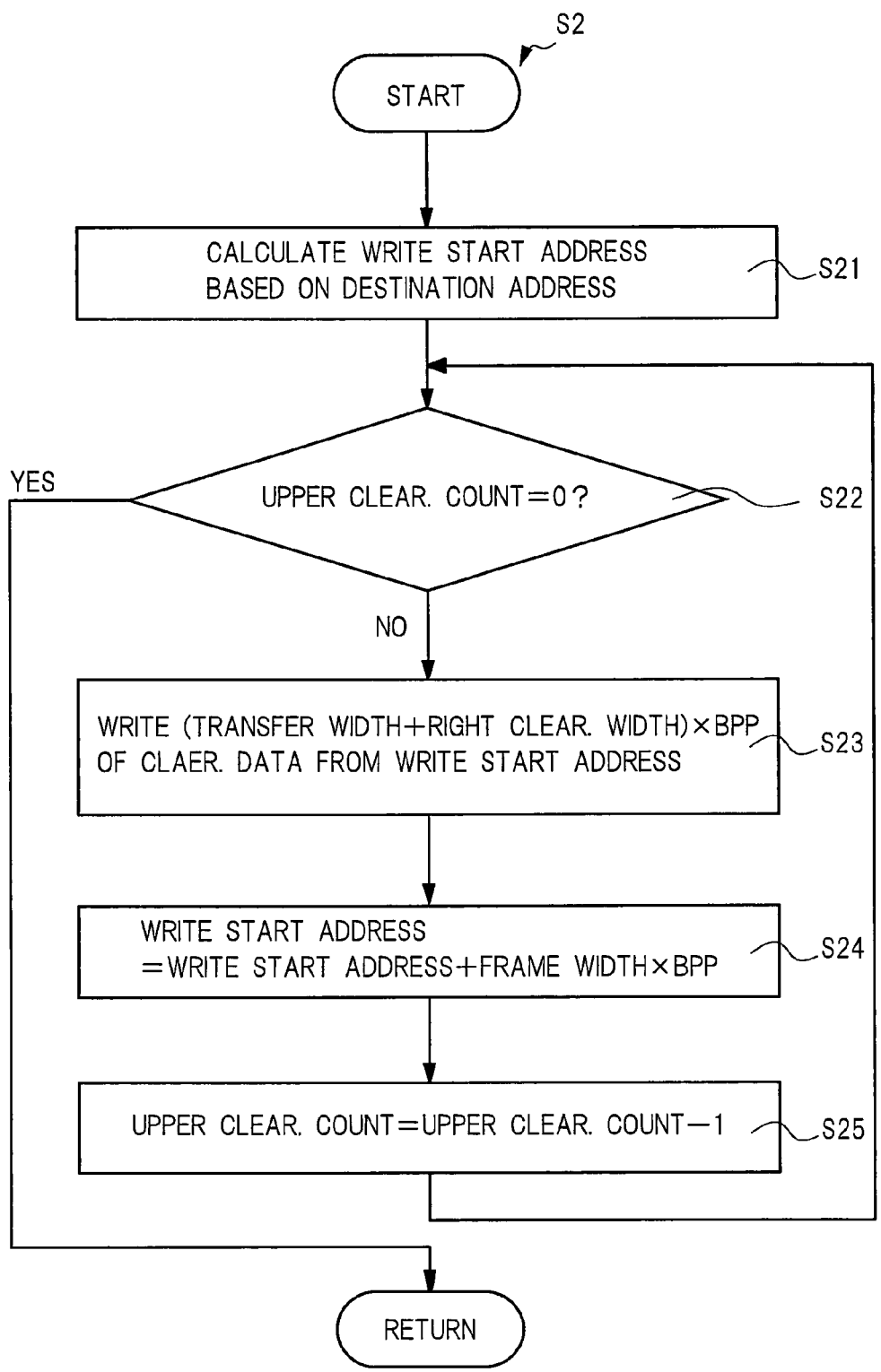
FIG. 7 is a flow chart that shows the details of the clearing process for an upper clearance region (step S2) shown in FIG. 5.

FIG. 7 is the flow chart which shows the details (steps S21-S25) of the clearance process (step S2) in the upper clearance region.

Step S21: The destination address T is read from the destination register 71, and used in the calculation of the initial value of the write start address W according to the following equation: the write start address W=the destination address T−(the left clearance width LC+the upper clearance height UC×the frame width FW)×the BPP (cf. FIG. 3). In other words, the initial value of the write start address W is assigned to the pixel W at the upper left corner of the original character P1 (cf. FIG. 10). On the other hand, the upper clearance height UC is read from the upper clearance register 63, and set to be the initial value of the upper clearance count D (cf. FIG. 4).

Step S22: It is determined whether or not the upper clearance count D reaches 0. The process proceeds to the step S23 if the upper clearance count D does not yet reach 0. The step S2 is finished if the upper clearance count D reaches 0.

Step S23: The clearance data is read from the clearance data register 80, and repeatedly copied from the write start address W (cf. FIG. 11). Here, the number of times of copying the clearance data is equal to the transfer width W1 since the right clearance width is 0. In other words, the total amount of the series of the clearance data is equal to the transfer width W1 multiplied by the BPP (cf. FIGS. 3 and 4). Furthermore, the series of the clearance data is preferably written by the burst transfer (cf. FIGS. 3 and 4).

Step S24: The write start address is incremented by the frame width FW×the BPP (cf. FIGS. 3 and 4). Thus, the head address of the next line included in the upper clearance region W1×UC is set to be a new write start address.

Step S25: The upper clearance count D is decremented by one (cf. FIG. 4).

Through the repetition of the steps S22-S25, the clearance data is written line by line in the regions in the frame buffer 2 assigned to the upper clearance region W1×UC by the burst transfer. Thus, the original character P1 is covered with the background color in the upper clearance region W1×UC (cf. FIG. 11).

Figure 8:
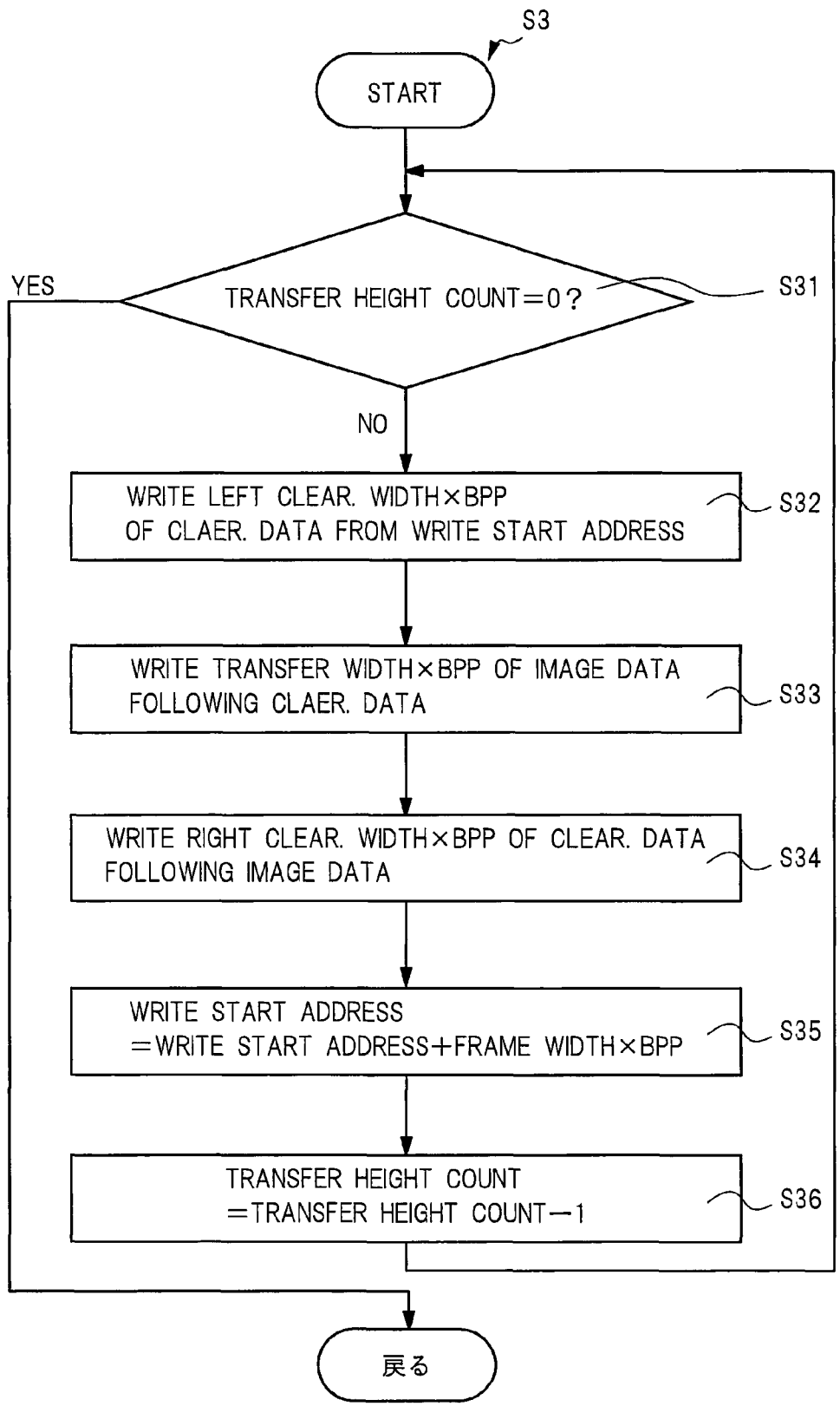
FIG. 8 is a flow chart that shows the details of the writing process for the image data (step S3) shown in FIG. 5.

FIG. 8 is the flow chart which shows the details (steps S31-S36) of the writing process (step S3) of the image data.

Step S31: It is determined whether or not the transfer height count E reaches 0. The process proceeds to the step S32 if the transfer height count E does not yet reach 0. The step S3 is finished if the transfer height count E reaches 0.

Step S32: The clearance data is read from the clearance data register 80, and repeatedly copied from the write start address W (cf. FIG. 12). At that time, the pixel W to which the write start address is assigned is always located under the left end of the upper clearance region W1×UC, that is, on the left end of the left clearance region LC×H1 (cf. FIGS. 3 and 12). Furthermore, the number of times of copying the clearance data is equal to the left clearance width LC. In other words, the total amount of the series of the clearance data is equal to the left clearance width LC multiplied by the BPP (cf. FIG. 4).

Step S33: Following the clearance data, the one line of the image data to be transferred P2 is successively written (cf. FIG. 12). At that time, the pixel to which the head address of the one line is assigned is always located on the left end of the second rectangular region Q (cf. FIGS. 3, 4, and 12). Furthermore, the total amount of the one line of the image data is equal to the transfer width W1 multiplied by the BPP (cf. FIG. 4).

Step S34: The step S33 is skipped since the right clearance width is 0 (cf. FIG. 4).

Through the steps S32, S33, and S34, in particular, the clearance data and one line of the image data to be transferred is successively written by the series of burst transfers (cf. FIGS. 3 and 4). Furthermore, a portion of the clearance data last copied in the step S32 may be integrated into the same burst unit with a portion of the image data to be transferred P2 that is first written in the step S33, and the burst unit may be sent to the frame buffer 2 at the same time.

Step S35: The write start address is incremented by the frame width FW×the BPP (cf. FIGS. 3 and 4). Accordingly, the address of the pixel located immediately under the pixel W to which the original write start address has been assigned is assigned to a new write start address. Thus, the pixel to which the write start address is assigned is always located on the left end of the left clearance region LC×H1.

Step S36: The transfer height count E is decremented by one (cf. FIG. 4).

Figure 12:
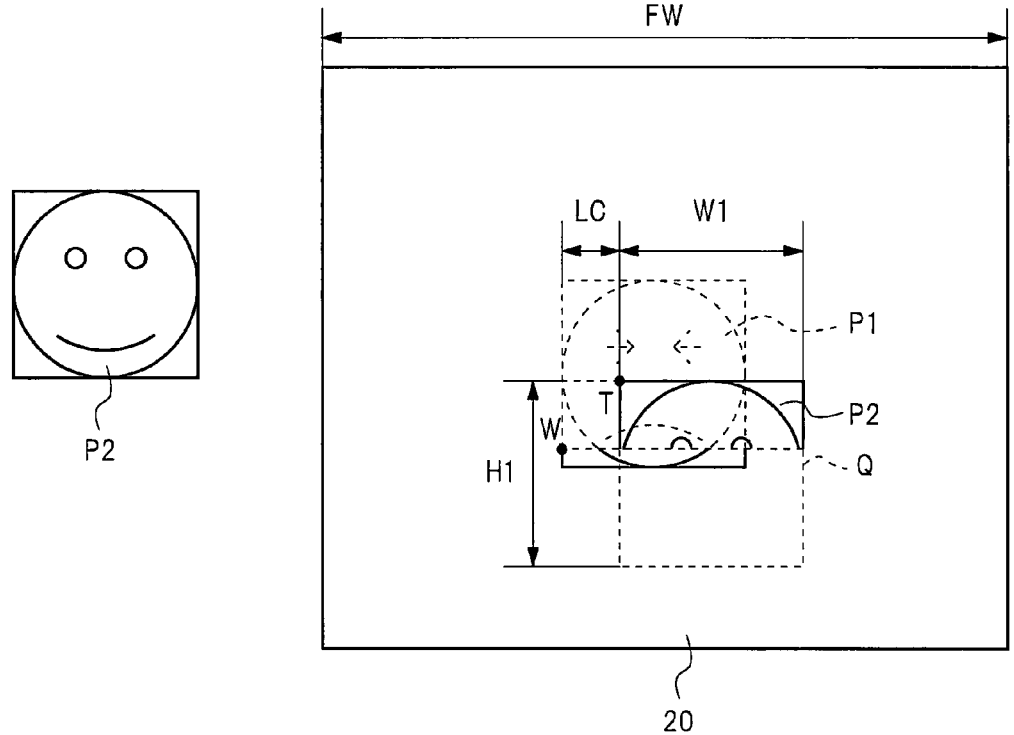
FIG. 12 is a schematic diagram that illustrates a process for clearing the original character displayed on the screen and drawing the new character stored in the image memory into the second rectangular region that is located at the lower right of the first rectangular region. Following the process shown in FIG. 11, clearance data is written into an area in the frame buffer assigned to a left clearance region, and data representing the new character is written into the frame buffer.

Through the repetition of the steps S31-S36, the clearance data is copied into the region in the frame buffer 2 assigned to the left clearance region LC×H1, and in particular, the original character P1 is covered with the background color (cf. FIG. 12). In addition to that, the image data to be transferred P2 is written into the region in the frame buffer 2 assigned to the second rectangular region Q. The copying of the clearance data and the writing of the image data are performed by the series of burst transfers, and therefore the processes are fast.

Figure 9:
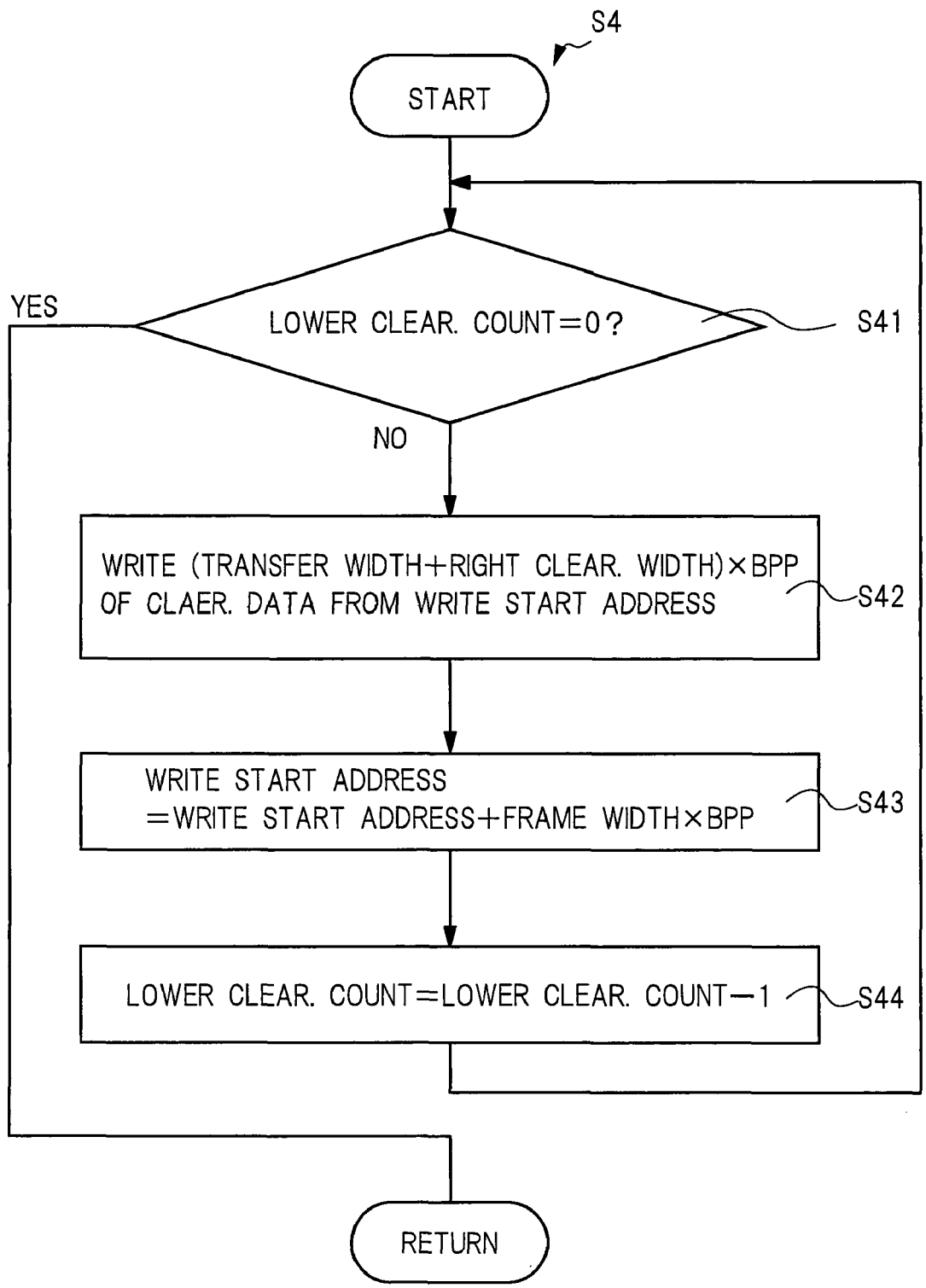
FIG. 9 is a flow chart that shows the details of the clearing process for a lower clearance region (step S4) shown in FIG. 5.

FIG. 9 is the flow chart which shows the details (steps S41-S44) of the clearance process (step S4) of the lower clearance region.

Figure 13:
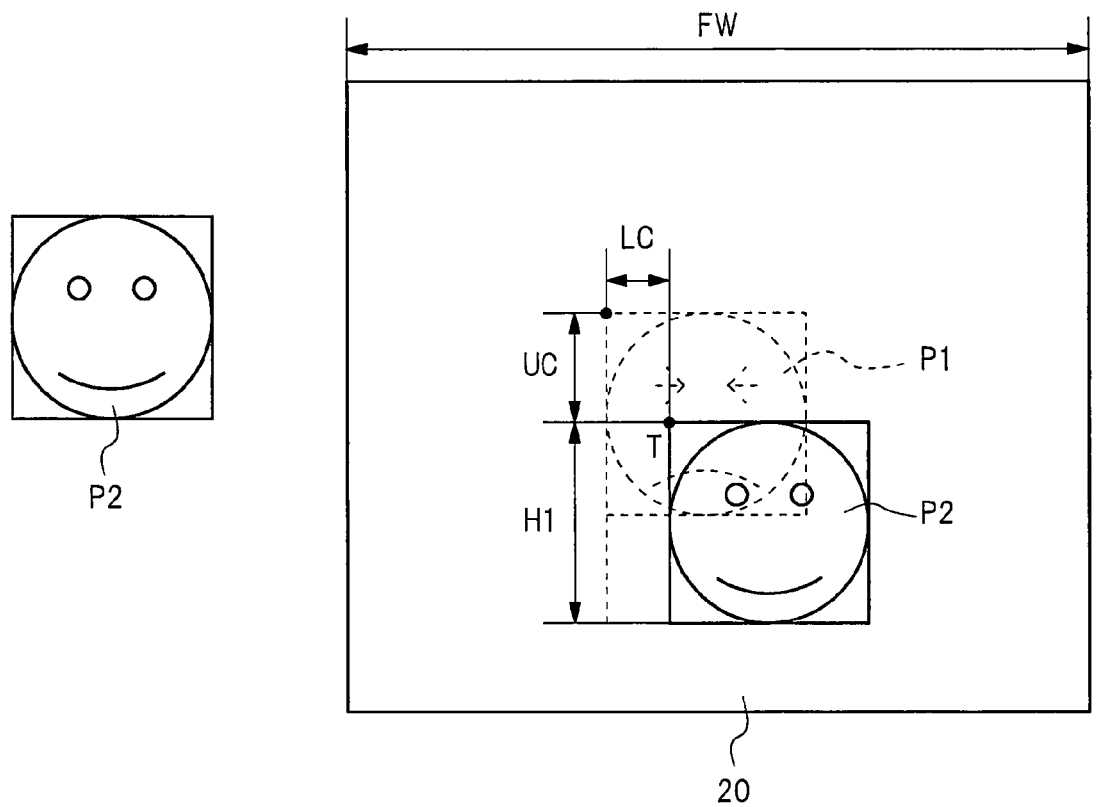
FIG. 13 is a schematic diagram that shows an appearance when the original character that had been displayed on the screen has been cleared and the new character stored in the image memory has been drawn in the second rectangular region that is located at the lower right of the first rectangular region, which is a result of the processes shown in FIGS. 10-12.
Figure 14:
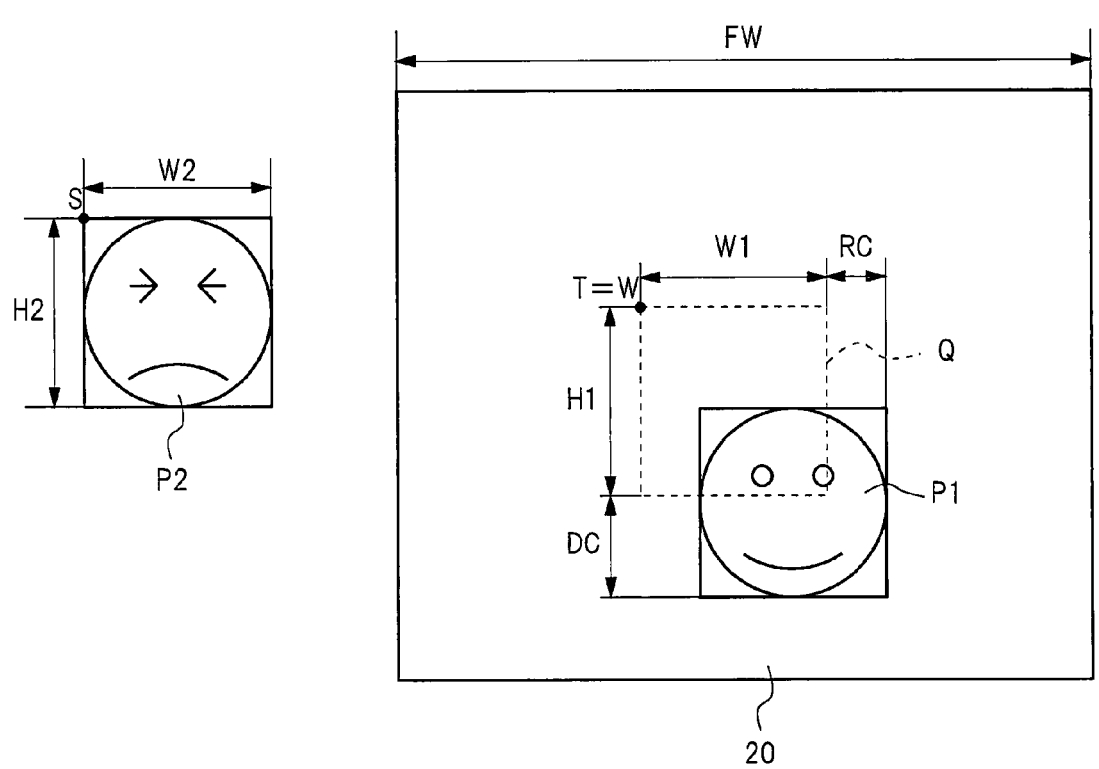
FIG. 14 is a schematic diagram that illustrates a process for clearing an original character displayed on a screen and drawing a new character stored in an image memory into a second rectangular region that is located at the upper left of a first rectangular region. First, the initial value of a write start address in the frame buffer is calculated on the basis of the first rectangular region and the second rectangular region.

Step S41: It is determined whether or not the lower clearance count F reaches 0. The process proceeds to the step S42 if the lower clearance count F does not yet reach 0. The step S4 is finished if the lower clearance count F reaches 0. Since the lower clearance height is 0 in the example shown in FIGS. 10-13, the data selector unit 52 suspends the selection of the data to be written into the frame buffer 2 (cf. FIG. 4). Accordingly, the clearance process (step S4) for the lower clearance region is skipped, and the writing process of the image data is finished. Thus, on the screen 20 as shown in FIG. 13, the display region of the character is shifted rightward by the left clearance width LC, and downward by the upper clearance height UC. Furthermore, the original character P1 is replaced with the new character P2.

For example, a case shown in FIGS. 14-17 is assumed, where the rectangular image drawing device 10 clears an original character P1 displayed in a region (the first rectangular region), and then displays a new character P2 in a second rectangular region Q located in the upper left of the first rectangular region. Here, the image data (brightness data) which represents the new character P2 has been contiguously stored in specific regions of the image memory 1 in advance. In particular, only the image data to be transferred P2 is prepared in the image memory 1 in advance, and there is no need to prepare the clearance data to be written into clearance regions, in a manner similar to that in the case shown in FIGS. 10-13.

First, the computing unit 6 sets data in the register groups 61-65 and 71-80 in a manner similar to that in the case shown in FIGS. 10-13. Note that data on the sizes of the clearance regions are different from the case in FIGS. 10-13. The left clearance register 76 holds 0 used as the left clearance width. The right clearance register 77 holds an amount RC of the leftward shift of the character (in particular, the number of pixels arranged in the transverse direction between the right ends of the first rectangular region P1 and the second rectangular region Q) that is used as the right clearance width (cf. FIG. 14). The upper clearance register 78 holds 0 used as the upper clearance height. The lower clearance register 79 holds an amount DC of the upward shift of the character (in particular, the number of lines located between the lower ends of the first rectangular region P1 and the second rectangular region Q) that is used as a lower clearance height (cf. FIG. 14).

Next, the integrated circuit 3 transfers the image data from the image memory 1 to the frame buffer 2 in the order of the steps S1, S2, S3, and S4 (cf. FIG. 5).

Step S1: The reading unit 4 reads the image data to be transferred P2 from the image memory 1 (cf. FIG. 1). Here, the transfer width, the transfer height, and the BPP of the image data to be transferred that has been prepared in the image memory 1 in advance are preferably matched with the transfer width W1, the transfer height H1, and the BPP of the image data to be written into the regions in the frame buffer 2 assigned to the region Q on the screen 20, respectively. Alternatively, the read image data may be processed before writing into the frame buffer 2, and thereby adjusted so that its transfer width, transfer height, and BPP are respectively matched with the transfer width W1, the transfer height H1, and the BPP of the image data to be written into the above-described regions in the frame buffer 2.

Step S2: The writing unit 5 sets the destination address T to be the initial value of the writhe start address W since both the upper clearance height and the left clearance width are 0 (cf. FIGS. 1 and 14). In particular, the upper clearance region is not set in contrast to the case shown in FIGS. 10-13.

Step S3: The writing unit 5 writes the image data to be transferred P2 into the region in the frame buffer 2 assigned to the region Q, and at the same time, clears the region in the frame buffer 2 assigned to the right clearance region RC×H1 (cf. FIG. 15). Here, the right clearance region RC×H1 is a rectangular region that adjoins to the right side of the region Q on the screen 20 and includes the original character P1, and its width and height are equal to the right clearance width RC and the transfer height H1, respectively.

Step S4: The writing unit 5 clears the region in the frame buffer 2 assigned to the lower clearance region (W1+RC)× DC (cf. FIGS. 16 and 17). Here, the lower clearance region (W1+RC)×UC is a rectangular region that adjoins to the lower end of the region Q on the screen 20, and includes the original character P1. The width of the lower clearance region is equal to the sum of the transfer width W1 and the right clearance width RC, and the height thereof is equal to the lower clearance height DC. The right and left ends of the lower clearance region (W1+RC)×UC are respectively matched with the right and left ends of a third region that is a total of the first rectangular region P1 and the second rectangular region Q. In the case shown in FIGS. 16 and 17, the left end of the lower clearance region (W1+RC)×UC is matched with the left end of the second rectangular region Q, and the right end thereof is matched with the right end of the first rectangular region P1.

The reading process of the image data (step S1) progresses in accordance with the flow chart shown in FIG. 6, in a manner similar to that in the case shown in FIGS. 10-13. Accordingly, the details can be found in the explanation about the case shown in FIGS. 10-13.

The clearance process in the upper clearance region (step S2) proceeds in accordance with the flow chart show in FIG. 7.

Step S21: The destination address T is read from the destination register 71, and used in the calculation of the initial value of the write start address W according to the following equation: the write start address W=the destination address T−(the left clearance width LC+the upper clearance height UC×the frame width FW)×the BPP (cf. FIG. 3). However, the initial value of the write start address W is equal to the destination address T, since both the upper clearance height and the left clearance width are 0 (cf. FIG. 14). On the other hand, the upper clearance height 0 is read from the upper clearance register 63, and set to be the initial value of the upper clearance count D (cf. FIG. 4).

Step S22: It is determined whether or not the upper clearance count D reaches 0. However, the upper clearance count D has been already 0, and accordingly the step S2 is finished. In other words, the clearance process for the upper clearance region is skipped, and the writing process of the image data is started.

The writing process of the image data (step S3) proceeds in accordance with the flow chart show in FIG. 8.

Step S31: It is determined whether or not the transfer height count E reaches 0. The process proceeds to the step S32 if the transfer height count E does not yet reach 0. The step S3 is finished if the transfer height count E reaches 0.

Step S32: The step S32 is skipped since the left clearance width is 0 (cf. FIG. 4).

Step S33: The one line of the image data to be transferred P2 is successively written from the write start address W (cf. FIG. 15). At that time, the pixel W to which the write start address is assigned is always located on the left end of the second rectangular region Q (cf. FIGS. 3 and 4). Furthermore, the amount of the one line of the image data P2 to be successively written is equal to the transfer width W1 multiplied by the BPP (cf. FIG. 4).

Step S34: Following the one line of image data to be transferred P2, the clearance data is repeatedly copied from the clearance data register 80 (cf. FIG. 15). At that time, the pixel WR to which the head address of a series of the clearance data is assigned is always located on the right end of the second rectangular region Q (cf. FIGS. 3, 4, and 15). Furthermore, the number of times of copying the clearance data is equal to the right clearance width RC. In other words, the total amount of the series of the clearance data is equal to the right clearance width RC multiplied by the BPP (cf. FIG. 4).

Through the steps S32, S33, and S34, in particular, the clearance data and one line of the image data to be transferred is successively written by the series of burst transfers (cf. FIGS. 3 and 4). Furthermore, a portion of the image data to be transferred last copied in the step S33 may be integrated into the same burst unit with a portion of the clearance data first written in the step S34, and the burst unit may be sent to the frame buffer 2 at the same time.

Step S35: The write start address is incremented by the frame width FW×the BPP (cf. FIGS. 3 and 4). Accordingly, the address of the pixel located immediately under the pixel W to which the original write start address has been assigned is assigned to a new write start address. Thus, the pixel to which the write start address is assigned is always located on the left end of the second rectangular region Q.

Step S36: The transfer height count E is decremented by one (cf. FIG. 4).

Figure 15:
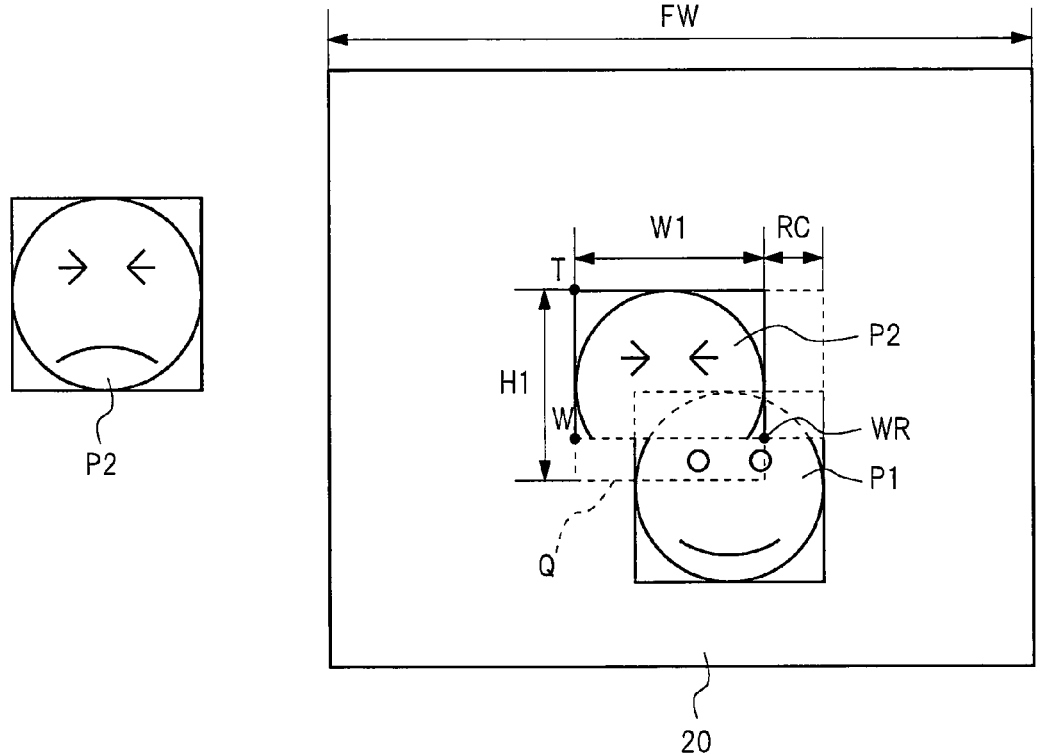
FIG. 15 is a schematic diagram that illustrates a process for clearing the original character displayed on the screen and drawing the new character stored in the image memory into the second rectangular region that is located at the upper left of the first rectangular region. Following the process shown in FIG. 14, data representing the new character is written into the frame buffer, and clearance data is written into an area in the frame buffer assigned to a right clearance region.
Figure 16:
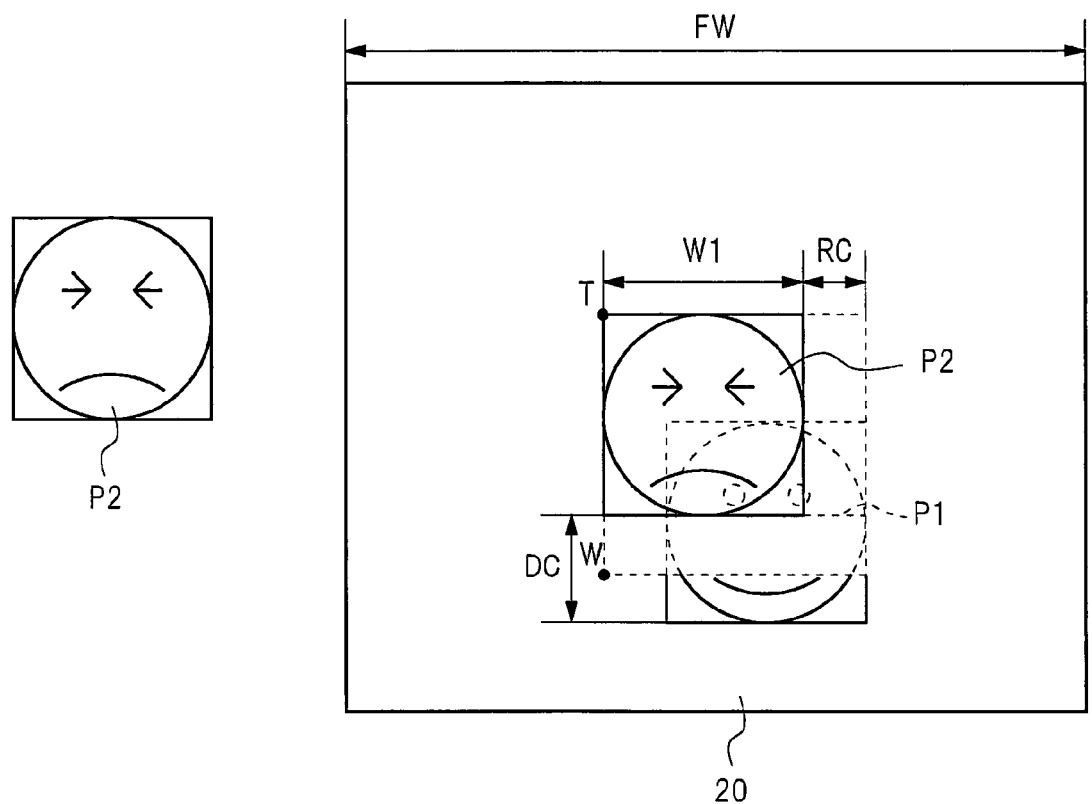
FIG. 16 is a schematic diagram that illustrates a process for clearing the original character displayed on the screen and drawing the new character stored in the image memory into the second rectangular region that is located at the upper left of the first rectangular region. Following the process shown in FIG. 15, clearance data is written into an area in the frame buffer assigned to a lower clearance region.

Through the repetition of the steps S31-S36, the image data to be transferred P2 is written into the region in the frame buffer 2 assigned to the second rectangular region Q, and in particular, the original character P1 is covered with the background color (cf. FIG. 15). In addition to that, the clearance data is written into the region in the frame buffer 2 assigned to the right clearance region RC×H1. The copying of the clearance data and the writing of the image data are performed by the series of burst transfers, and therefore the processes are fast.

The clearance process for the lower clearance region (step S4) proceeds in accordance with the flow chart show in FIG. 9.

Step S41: It is determined whether or not the lower clearance count F reaches 0. The process proceeds to the step S42 if the lower clearance count F does not yet reach 0. The step S4 is finished if the lower clearance count F reaches 0.

Step S42: The clearance data is repeatedly copied from the write start address W (cf. FIG. 16). At that time, the pixel W to which the write start address is assigned is always located under the left end of the second rectangular region Q (cf. FIGS. 3, 4, and 16). Furthermore, the total amount of the series of the clearance data is equal to the BPP times the sum W1+RC of the transfer width W1 and the right clearance width RC (cf. FIGS. 3 and 4). In addition, the series of the clearance data is written by the burst transfer (cf. FIGS. 3 and 4).

Step S43: The write start address is incremented by the frame width FW×the BPP (cf. FIGS. 3 and 4). Thus, the head address of the next line included in the lower clearance region (W1+RC)×DC is set to be a new write start address.

Step S44: The lower clearance count F is decremented by one (cf. FIG. 4).

Figure 17:
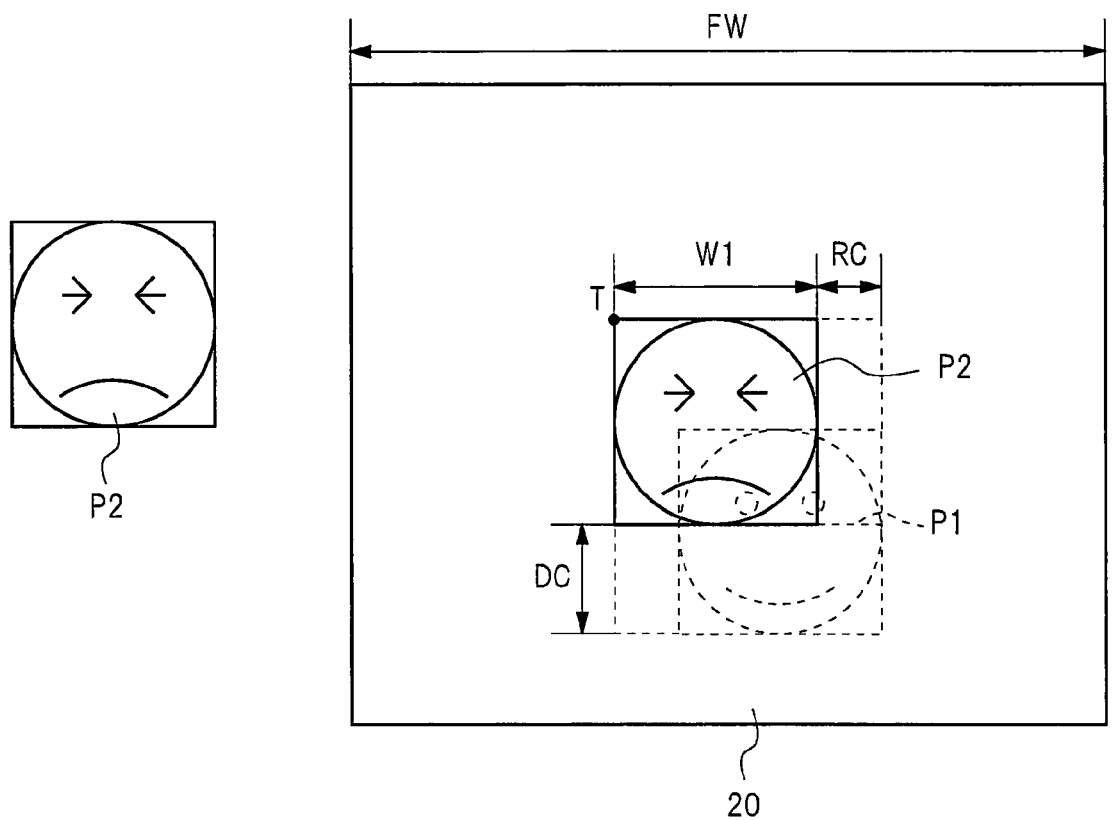
FIG. 17 is a schematic diagram that shows an appearance when the original character that had been displayed on the screen has been cleared and the new character stored in the image memory has been drawn in the second rectangular region that is located at the lower right of the first rectangular region, which is a result of the processes shown in FIGS. 14-16.
Figure 18:
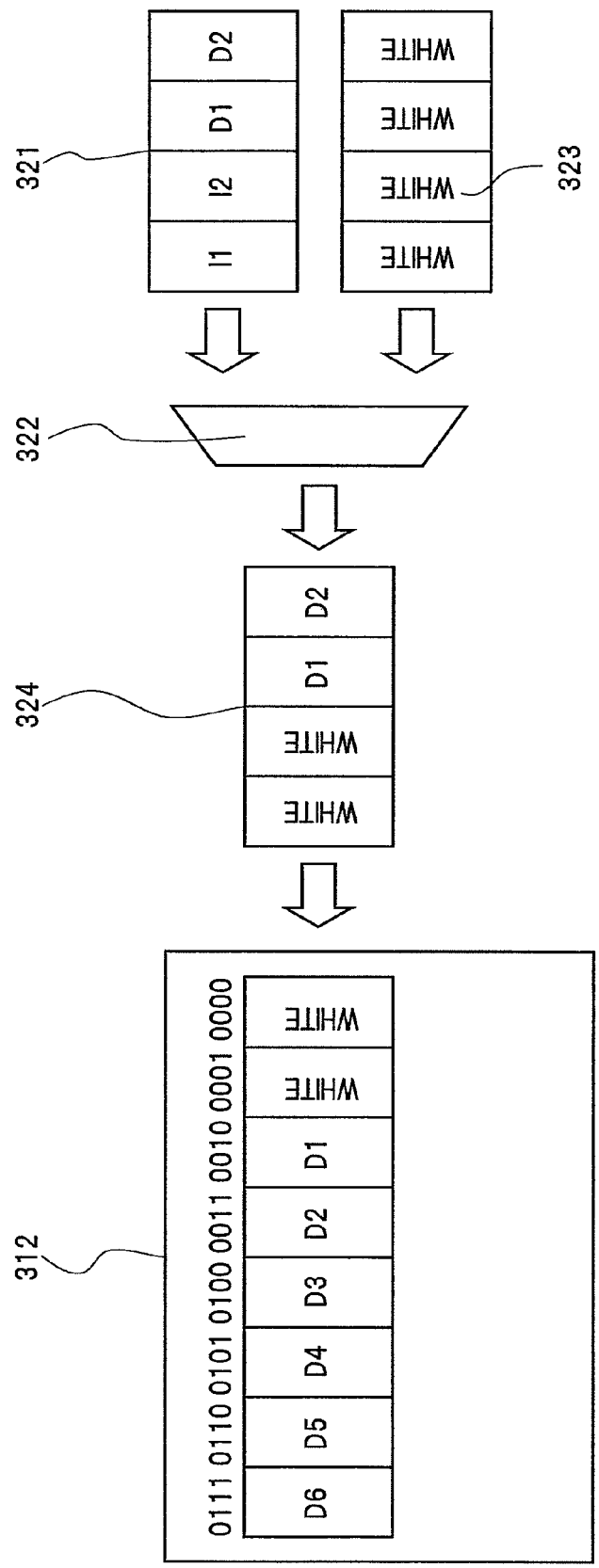
FIG. 18 is a block diagram shows a prior art aiming to speed up memory accesses.

Through the repetition of the steps S41-S44, the clearance data is written line by line in the region in the frame buffer 2 assigned to the lower clearance region (W1+RC)×DC by the burst transfers. In that region, in particular, the original character P1 is covered with the background color (cf. FIG. 16). Thus, as shown in FIG. 17, the display region of the character is shifted on the screen 20 leftward by the right clearance width RC, and upward by the lower clearance height DC. Furthermore, the original character P1 is replaced with the new character P2. A similar method is applicable to cases where a new character is displayed in the region located in the lower left or upper right of the display region of the original character.

When the rectangular image drawing device according to the embodiment of the present invention performs a CG animation process, in particular a sprite, the device prepares only the image data to be transferred P2 in the source image memory 1 before the transfer, as described above. On the other hand, the clearance data to be written into the frame buffer 2 is not prepared in the image memory 1. The clearance data is repeatedly copied from the clearance data register 80 to the frame buffer 2 when the image data to be transferred P2 is written into the frame buffer 2. Thus, the data sent from the image memory 1 to a data bus is limited only to the image data to be transferred P2, and therefore, the effective bandwidth is substantially maximized for the reading from the image memory 1. This further expedites the accesses to the image memory 1.

Furthermore, the rectangular image drawing device according to the embodiment of the present invention automatically performs both the allocation of the clearance regions and the writing of the clearance data therein, in particular, on the basis of the data held by the register group 71-80, as described above. Upper layer applications simply set necessary data in the register group 71-80, and thereby can perform both the clearance of the original character P1 and the overwriting of the new character P2 at the same time. Furthermore, both the writing of the image data and the copy of the clearance data to the clearance region are performed at high speed by a series of burst transfers. This further expedites CG animation processes.

Note that the above-described embodiment writes data successively. Alternatively, all the data to be successively written by a burst transfer may be simultaneously written by a single memory access if all the data can be integrated into a single burst unit.

INDUSTRIAL APPLICABILITY

The rectangular image drawing device and method according to the present invention relate to motion picture processes in a display device, for example, as described above. Thus, the present invention clearly has industrial applicability.

I claim:

1. A rectangular image drawing device configured to
write brightness data of a background color into an address region in an image memory assigned to a first rectangular region on a screen other than an overlap between the first rectangular region and a second rectangular region, and
write brightness data of a rectangular image into an address region of the image memory assigned to the second rectangular region,
the rectangular image drawing device comprising:
a computing unit configured to calculate the number of background-color pixels to be added to the rectangular image in the transverse direction on the basis of the amount of a transverse shift from the first rectangular region to the second rectangular region; and
a writing unit configured to write brightness data of both the background-color pixels and the rectangular image into each line of the image memory simultaneously or successively, wherein the writing unit is configured to use burst transfer in writing, and if the amount of data to be written falls within a single burst unit, the writing unit writes the data simultaneously, and if the amount of data to be written extends over more than one burst unit, the writing unit writes the data successively.

2. A rectangular image drawing device according to claim 1, wherein
for the shift from the first rectangular region to the second rectangular region comprising a longitudinal shift,
the computing unit is configured to calculate the number of background-color lines to be added to the rectangular image in the longitudinal direction on the basis of the amount of the longitudinal shift; and the writing unit is configured to write brightness data of the background-color lines simultaneously or successively into each line of the image memory, at least at the addresses in the image memory assigned across a third region, which is the total of the first rectangular region and the second rectangular region.

3. A rectangular image drawing device according to claim 1, wherein the writing unit is configured to negate a write enable signal for a write disabled address included in a burst unit that comprises a write start address or a write end address that does not match with any boundary of the burst unit.

4. A method for drawing a rectangular image by using a device configured to write brightness data of a background color into an address region of an image memory assigned to a first rectangular region on a screen other than an overlap between the first rectangular region and a second rectangular region, and write brightness data of a rectangular image into an address region of the image memory assigned to the second rectangular region, the method comprising:

calculating the number of background-color pixels to be added to the rectangular image in the transverse direction on the basis of the amount of a transverse shift from the first rectangular region to the second rectangular region; and writing brightness data of both the background-color pixels and the rectangular image into each line of the image memory simultaneously or successively; and writing the data into the image memory using burst transfer, and if the amount of data to be written falls within a single burst unit, writing the data simultaneously, and if the amount of data to be written extends over more than one burst unit, writing unit the data successively.

5. An integrated circuit comprising:

a circuit configured to write brightness data of a background color into an address region of an image memory assigned to a first rectangular region on a screen other than an overlap between the first rectangular region and a second rectangular region, and write brightness data of a rectangular image into an address region of the image memory assigned to the second rectangular region;

a holding circuit configure to hold the number of background-color pixels to be added to the rectangular image in the transverse direction, which has been calculated by an external computing circuit based on the amount of a transverse shift from the first rectangular region to the second rectangular region; and a writing circuit configured to write brightness data of both the background-color pixels and the rectangular image into each line of the image memory simultaneously or successively, wherein the writing unit is configured to use burst transfer in writing, and if the amount of data to be written falls within a single burst unit, the writing unit writes the data simultaneously, and if the amount of data to be written extends over more than one burst unit, the writing unit writes the data successively.

* * * * *